US006954220B1

(12) United States Patent
Bowman-Amuah

(10) Patent No.: US 6,954,220 B1
(45) Date of Patent: Oct. 11, 2005

(54) USER CONTEXT COMPONENT IN ENVIRONMENT SERVICES PATTERNS

(75) Inventor: Michel K. Bowman-Amuah, Colorado Springs, CO (US)

(73) Assignee: Accenture LLP, Palo Alto, CA (US)

( * ) Notice: Subject to any disclaimer, the term of this patent is extended or adjusted under 35 U.S.C. 154(b) by 0 days.

(21) Appl. No.: 09/386,989

(22) Filed: Aug. 31, 1999

(51) Int. Cl.[7] .......................... G06F 3/00; G06F 13/00; G06F 17/30

(52) U.S. Cl. ...................... 345/741; 345/733; 345/740; 345/742; 707/9; 709/225; 709/229

(58) Field of Search ............................... 345/733, 738, 345/739, 740, 743–747, 811; 707/9–10; 709/217, 225, 229

(56) References Cited

U.S. PATENT DOCUMENTS

| | | | | |
|---|---|---|---|---|
| 5,047,918 A | 9/1991 | Schwartz et al. | ........... | 707/203 |
| 5,133,075 A | 7/1992 | Risch | ......................... | 707/201 |
| 5,187,787 A | 2/1993 | Skeen et al. | ................ | 709/314 |
| 5,241,580 A | 8/1993 | Babson, III | .................. | 379/15 |
| 5,291,593 A | 3/1994 | Abraham et al. | ........... | 707/103 |
| 5,301,270 A | 4/1994 | Steinberg et al. | ........... | 345/326 |

(Continued)

FOREIGN PATENT DOCUMENTS

| | | | |
|---|---|---|---|
| EP | 1023456 A2 | 1/2000 | ................. 100/100 |
| WO | WO92/01251 | 1/1992 | |
| WO | WO 99/08208 | 2/1999 | ........... G06F/17/30 |
| WO | WO 99/44155 | 9/1999 | |
| WO | PCT/US00/23885 | 8/2000 | |
| WO | PCT/US00/23999 | 8/2000 | |
| WO | PCT/US00/24082 | 8/2000 | |
| WO | PCT/US00/24083 | 8/2000 | |
| WO | PCT/US00/24084 | 8/2000 | |
| WO | PCT/US00/24085 | 8/2000 | |
| WO | PCT/US00/24086 | 8/2000 | |
| WO | PCT/US00/24125 | 8/2000 | |
| WO | PCT/US00/24188 | 8/2000 | |
| WO | PCT/US00/24189 | 8/2000 | |
| WO | PCT/US00/24236 | 8/2000 | |

OTHER PUBLICATIONS

Kovalerchuck et al., comparison of relational methods and attribute–based methods for data mining in intelligent systems, proceedings of the 1999 IEEE, International Symposium on Intelligent Systems and Semiotics, Cambridge, MA, PP 162–166. Dated Sep. 1999.

(Continued)

*Primary Examiner*—Raymond J. Bayeri
*Assistant Examiner*—X. L. Bautista
(74) *Attorney, Agent, or Firm*—Oppenheimer Wolff & Donnelly LLP

(57) ABSTRACT

A system and method are provided for maintaining a security profile throughout nested service invocations on a distributed component-based system. Interconnections are provided between distributed components each having nested service invocations. A user context instance is created upon successful identification of the user. A request is received from the user to invoke a first service on a first component, wherein the first component invokes a second service of a second component, and wherein completion of the second service is necessary to complete the first service. The user context is queried for a unique user identifier. The unique user identifier is compared with an access control list for verifying that the user has access to the first component. The unique user identifier is also compared with an access control list for verifying that the user has access to the second service of the second component.

15 Claims, 20 Drawing Sheets

U.S. PATENT DOCUMENTS 5,301,320 A 4/1994 McAtee et al. ............. 395/650
5,313,636 A 5/1994 Noble et al. .................... 707/1
5,414,812 A 5/1995 Filip et al. .................. 707/103
5,434,978 A 7/1995 Dockter et al. ............. 709/230
5,437,038 A 7/1995 Silberbauer et al. ......... 395/700
5,457,797 A 10/1995 Butterworth et al. ....... 709/302
5,463,686 A 10/1995 Lebourges .................. 379/220
5,471,629 A 11/1995 Risch ......................... 707/201
5,475,844 A 12/1995 Shiramizu et al. .......... 709/104
5,499,371 A 3/1996 Henninger et al. ............ 717/2
5,560,005 A 9/1996 Hoover et al. ................ 707/10
5,568,644 A 10/1996 Nelson et al. .............. 395/741
5,581,758 A 12/1996 Burnett et al. .............. 707/103
5,606,664 A 2/1997 Brown et al. ............... 709/224
5,623,418 A 4/1997 Rostoker et al. ............... 716/1
5,642,511 A 6/1997 Chow et al. ................ 395/701
5,649,139 A 7/1997 Weinreb et al. ............. 707/202
5,671,386 A 9/1997 Blair et al. ................. 395/405
5,675,748 A 10/1997 Ross .......................... 395/284
5,677,997 A 10/1997 Talatik ........................ 706/45
5,680,602 A 10/1997 Bloem et al. .................. 707/1
5,692,107 A 11/1997 Simoudis et al. ............. 706/12
5,706,506 A 1/1998 Jensen et al. ............... 707/103
5,708,828 A 1/1998 Coleman .................... 395/785
5,710,901 A 1/1998 Stodghill et al. ........... 345/339
5,715,397 A 2/1998 Ogawa et al. ......... 395/200.18
5,721,908 A 2/1998 Lagarde et al.
5,724,575 A 3/1998 Hoover et al. ................ 707/10
5,732,263 A 3/1998 Havens et al. .............. 707/103
5,732,270 A 3/1998 Foody et al. ............... 709/303
5,737,607 A 4/1998 Hamilton et al. ........... 395/701
5,751,965 A 5/1998 Mayo et al. ................ 709/224
5,758,351 A 5/1998 Gibson et al. .............. 707/104
5,761,513 A 6/1998 Yellin et al. ............... 395/705
5,764,235 A 6/1998 Hunt et al. ................. 345/428
5,764,955 A 6/1998 Doolan ....................... 709/223
5,774,660 A 6/1998 Brendel et al. ............. 709/201
5,778,368 A 7/1998 Hogan et al. ................. 707/10
5,787,413 A 7/1998 Kauffman et al. ............. 707/2
5,799,310 A 8/1998 Anderson et al. ........... 707/102
5,867,153 A 2/1999 Grandcolas et al. ........ 345/326
5,870,742 A 2/1999 Chang et al. .................. 707/8
5,870,746 A 2/1999 Knutson et al. ............ 707/101
5,872,973 A 2/1999 Mitchell et al. ............ 709/332
5,873,086 A 2/1999 Fujii et al. .................... 707/10
5,878,408 A 3/1999 Van Huben et al. ............ 707/1
5,890,133 A 3/1999 Ernst ............................ 705/7
5,892,909 A 4/1999 Grasso et al. ............... 709/201
5,896,383 A 4/1999 Wakeland ................... 370/400
5,898,870 A 4/1999 Okuda et al. ............... 709/104
5,905,873 A 5/1999 Hartmann et al. ..... 395/200.79
5,905,897 A 5/1999 Chou et al. ................. 395/733
5,907,704 A 5/1999 Gudmundson et al. ..... 395/701
5,909,540 A 6/1999 Carter et al. ................... 714/4
5,915,115 A 6/1999 Talati ........................... 717/5
5,920,703 A 7/1999 Campbell et al. ...... 395/200.66
5,933,816 A 8/1999 Zeanah et al. ................ 705/35
5,940,075 A 8/1999 Mutschler, III et al. .... 345/335
5,940,594 A 8/1999 Ali et al. .................... 709/203
5,946,694 A 8/1999 Copeland et al. ........... 707/103
5,946,697 A 8/1999 Shen .......................... 707/104
5,953,707 A 9/1999 Huang et al. ................. 705/10
5,958,012 A 9/1999 Battat et al. ................ 709/224
5,960,200 A 9/1999 Eager et al. ................... 717/5
5,966,451 A 10/1999 Utsumi ........................ 380/49
5,987,247 A 11/1999 Lau .............................. 717/2
5,987,501 A 11/1999 Hamilton et al. ........... 709/203
5,987,514 A 11/1999 Rangarajan ................. 709/224
5,987,633 A 11/1999 Newman et al. ............ 714/712
5,995,753 A 11/1999 Walker .......................... 717/2
5,995,945 A 11/1999 Notani et al. ................. 705/28
5,999,948 A 12/1999 Nelson et al.
6,006,230 A 12/1999 Ludwig et al. ............... 707/10
6,016,394 A 1/2000 Walker .......................... 717/1
6,018,743 A 1/2000 Xu ......................... 707/103 R
6,023,722 A 2/2000 Colyer ....................... 709/201
6,029,174 A 2/2000 Sprenger et al. ............ 707/103
6,029,177 A 2/2000 Sadiq et al. ................ 707/201
6,032,153 A 2/2000 Sadiq et al. ................ 707/103
6,035,303 A 3/2000 Baer et al. .................. 707/103
6,038,598 A 3/2000 Danneels .................... 709/219
6,041,365 A 3/2000 Kleinerman ................ 709/302
6,052,739 A 4/2000 Bopardikar et al. ........ 709/301
6,057,856 A 5/2000 Miyashita et al. .......... 345/435
6,070,191 A 5/2000 Narendran et al. ......... 709/226
6,078,960 A 6/2000 Ballard ....................... 709/229
6,081,837 A 6/2000 Stedman et al. ............ 709/219
6,083,276 A 7/2000 Davidson et al. .............. 717/1
6,085,198 A 7/2000 Skinner et al. ............. 707/103
6,092,118 A 7/2000 Tsang ......................... 709/246
6,108,703 A 8/2000 Leighton et al. ............ 709/226
6,115,752 A 9/2000 Chauhan ..................... 709/241
6,125,359 A 9/2000 Lautzenheiser et al. ....... 706/60
6,128,279 A 10/2000 O'Neil et al. ............... 370/229
6,141,660 A 10/2000 Bach et al. ................. 345/352
6,141,759 A 10/2000 Braddy ....................... 713/201
6,144,991 A 11/2000 England ..................... 709/205
6,148,335 A 11/2000 Haggard et al. ............ 709/224
6,148,361 A 11/2000 Carpenter et al. .......... 710/260
6,154,212 A 11/2000 Eick et al. .................. 345/356
6,157,940 A 12/2000 Marullo et al. ............... 709/22
6,157,953 A * 12/2000 Chang et al. ............... 709/225
6,182,182 B1 1/2001 Bradley et al. ............. 710/129
6,202,099 B1 3/2001 Gillies et al. ............... 709/317
6,223,209 B1 4/2001 Watson ....................... 709/201
6,243,761 B1 6/2001 Mogul et al. ............... 709/246
6,266,667 B1 * 7/2001 Olsson ........................ 707/10
6,286,001 B1 * 9/2001 Walker et al. ................. 707/9

OTHER PUBLICATIONS

Kinexis. Object–orientation and Transaction Processing Where Do They Meet. OOPSLA Keynote, Oct. 6–11, 1991.

Lee et al., Path Dictionary: A New Access Method for Query Processing in Object–oriented Databases. IEEE Transactions on Knowledge and Data Engineering, v10, n3, May/Jun. 1998.

Buddrus et al. Enacting Authorization Models for Object–oriented Databases Database and Expert Systems applications, Proceedings, Seventh International Workshop, Sep. 9–10, 1996, pp. 116–121.

Bertino et al. Trigger Inheritance and Overriding in an Active Object Database System. IEEE Transactions on Knowledge and Data Engineering, v12, n4, Jul./Aug. 2000.

ANSII Standard for the Programming C++pl , First Edition ISO/IEC 14882: 1998. Date Sep. 1998.

The Annotated C++ Reference Manual ANSII Base Document, M.A. Ellis and B. Stroustrup. Date Jul. 1990.

IBM Dictionary of Computing, pp. 140, 241, 299, 728.

Microsoft Corporation, Microsoft Solutions Framework Overview A Quick Tour of the MSF Models, URL: http://channels.microsoft.com/enterprise/support/support/consult, Viewed Oct. 9, 1999.

* cited by examiner

USER CONTEXT COMPONENT IN ENVIRONMENT SERVICES PATTERNS

CROSS REFERENCE TO RELATED APPLICATIONS

This application is related to U.S. patent application Ser. No. 09/387,747, filed Aug. 31, 1999, entitled A SYSTEM, METHOD AND ARTICLE OF MANUFACTURE FOR A DEVELOPMENT ARCHITECTURE FRAMEWORK and U.S. patent application Ser. No. 09/387,318, filed Aug. 31, 1999, A SYSTEM, METHOD AND ARTICLE OF MANUFACTURE FOR MAINTENANCE AND ADMINISTRATION IN AN E-COMMERCE APPLICATION FRAMEWORK, both of which are filed concurrently herewith and which are incorporated by reference in their entirety.

FIELD OF THE INVENTION

The present invention relates to security programs and more particularly to maintaining a security profile across various platforms.

BACKGROUND OF THE INVENTION

An important use of computers is the transfer of information over a network. Currently, the largest computer network in existence is the Internet. The Internet is a worldwide interconnection of computer networks that communicate using a common protocol. Millions of computers, from low end personal computers to high-end super computers are coupled to the Internet.

The Internet grew out of work funded in the 1960s by the U.S. Defense Department's Advanced Research Projects Agency. For a long time, Internet was used by researchers in universities and national laboratories to share information. As the existence of the Internet became more widely known, many users outside of the academic/research community (e.g., employees of large corporations) started to use Internet to carry electronic mail.

In 1989, a new type of information system known as the World-Wide-Web ("the Web") was introduced to the Internet. Early development of the Web took place at CERN, the European Particle Physics Laboratory. The Web is a wide-area hypermedia information retrieval system aimed to give wide access to a large universe of documents. At that time, the Web was known to and used by the academic/research community only. There was no easily available tool which allows a technically untrained person to access the Web.

In 1993, researchers at the National Center for Supercomputing Applications (NCSA) released a Web browser called "Mosaic" that implemented a graphical user interface (GUI). Mosaic's graphical user interface was simple to learn yet powerful. The Mosaic browser allows a user to retrieve documents from the World-Wide-Web using simple point-and-click commands. Because the user does not have to be technically trained and the browser is pleasant to use, it has the potential of opening up the Internet to the masses.

The architecture of the Web follows a conventional client-server model. The terms "client" and "server" are used to refer to a computer's general role as a requester of data (the client) or provider of data (the server). Under the Web environment, Web browsers reside in clients and Web documents reside in servers. Web clients and Web servers communicate using a protocol called "HyperText Transfer Protocol" (HTTP). A browser opens a connection to a server and initiates a request for a document. The server delivers the requested document, typically in the form of a text document coded in a standard Hypertext Markup Language (HTML) format, and when the connection is closed in the above interaction, the server serves a passive role, i.e., it accepts commands from the client and cannot request the client to perform any action.

The communication model under the conventional Web environment provides a very limited level of interaction between clients and servers. In many systems, increasing the level of interaction between components in the systems often makes the systems more robust, but increasing the interaction increases the complexity of the interaction and typically slows the rate of the interaction. Thus, the conventional Web environment provides less complex, faster interactions because of the Web's level of interaction between clients and servers.

SUMMARY OF THE INVENTION

A system and method are provided for maintaining a security profile throughout nested service invocations on a distributed component-based system. Interconnections are provided between distributed components each having nested service invocations. A user is identified. The user is associated with roles. A user context instance is created upon successful identification of the user. The user context instance also includes information about the user including the roles and a unique user identifier. A request is received from the user to invoke a first service on a first component, wherein the first component invokes a second service of a second component such that the user context instance is passed as a parameter from the first component to the second component, and wherein completion of the second service is necessary to complete the first service. The user context is queried for a unique user identifier. The unique user identifier is compared with an access control list for verifying that the user has access to the first component. The unique user identifier is also compared with an access control list for verifying that the user has access to the second service of the second component.

In one embodiment of the present invention, all user interactions may be logged as well. In another embodiment of the present invention, a user interface may be modified to provide access to actions that can be performed by the user based on the unique user identifier and the roles associated with the user.

In even a further embodiment of the present invention, the user context instance may also be passed along as a parameter of service invocations. Additionally, the first service invoked may associate any objects created, updated, or deleted as a result of the invocation of the first service with the user context instance. In another aspect of the present invention, the user context instance may also encapsulate security certificates of the user.

BRIEF DESCRIPTION OF THE DRAWINGS

The invention will be better understood when consideration is given to the following detailed description thereof. Such description makes reference to the annexed drawings wherein.

DETAILED DESCRIPTION OF THE PREFERRED EMBODIMENTS

Figure 1:
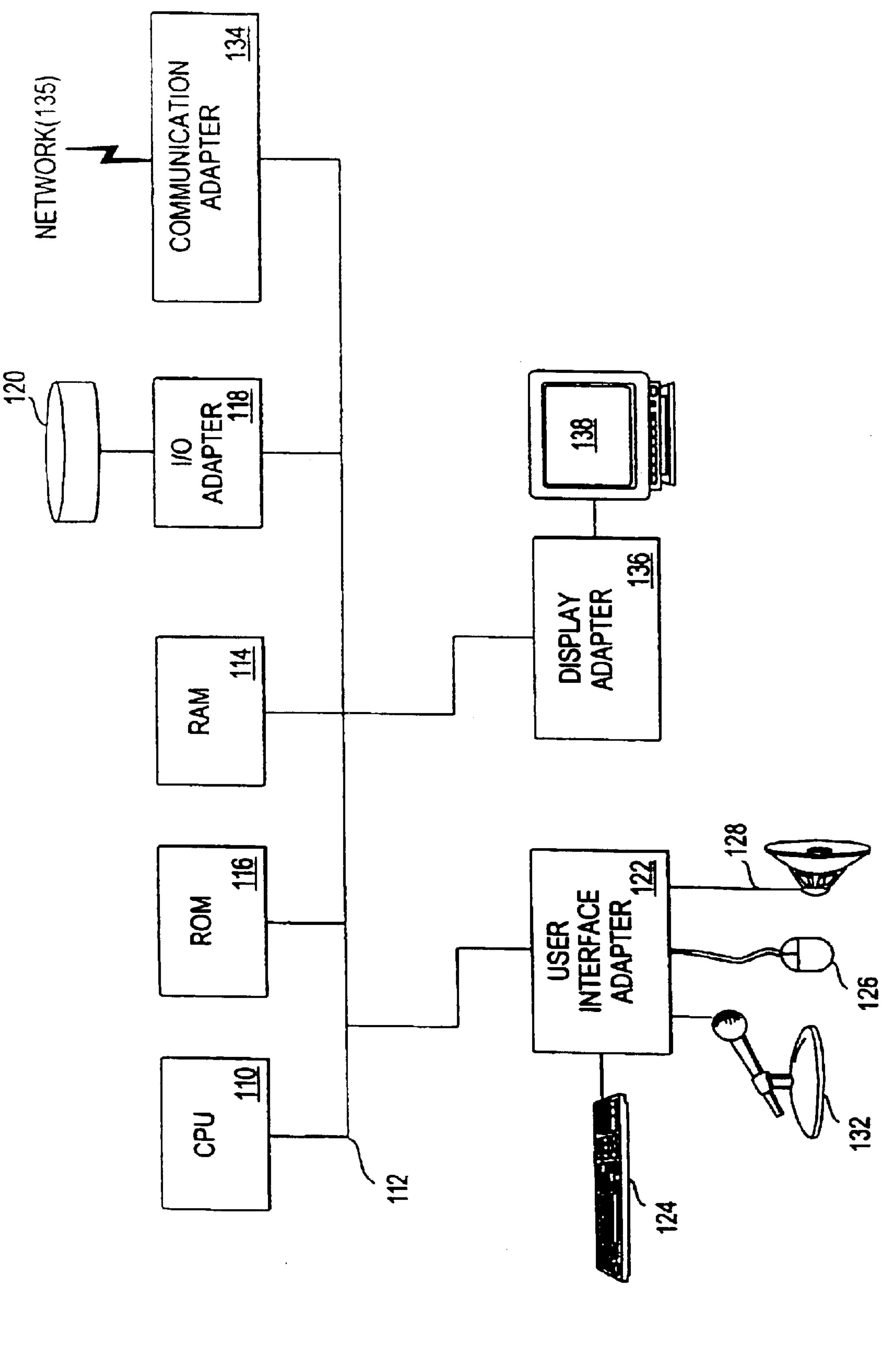
FIG. 1 is a schematic diagram of a hardware implementation of one embodiment of the present invention.

A preferred embodiment of a system in accordance with the present invention is preferably practiced in the context of a personal computer such as an IBM compatible personal computer, Apple Macintosh computer or UNIX based workstation. A representative hardware environment is depicted in FIG. 1, which illustrates a typical hardware configuration of a workstation in accordance with a preferred embodiment having a central processing unit 110, such as a microprocessor, and a number of other units interconnected via a system bus 112. The workstation shown in FIG. 1 includes a Random Access Memory (RAM) 114, Read Only Memory (ROM) 116, an 110 adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network (e.g., a data processing network) and a display adapter 136 for connecting the bus 112 to a display device 138. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Bemers-Lee, D. Connoly, "RFC 1866:

Hypertext Markup Language—2.0" (November 1995); and R. Fielding, H, Frystyk, T. Bemers-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

- Poor performance;
- Restricted user interface capabilities;
- Can only produce static Web pages;
- Lack of interoperability with existing applications and data; and
- Inability to scale.

Sun Microsystem's Java language solves many of the client-side problems by:

- Improving performance on the client side;
- Enabling the creation of dynamic, real-time Web applications; and
- Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

NETCENTRIC ARCHITECTURE FRAMEWORK

Framework Overview

Introduction

Figure 2:
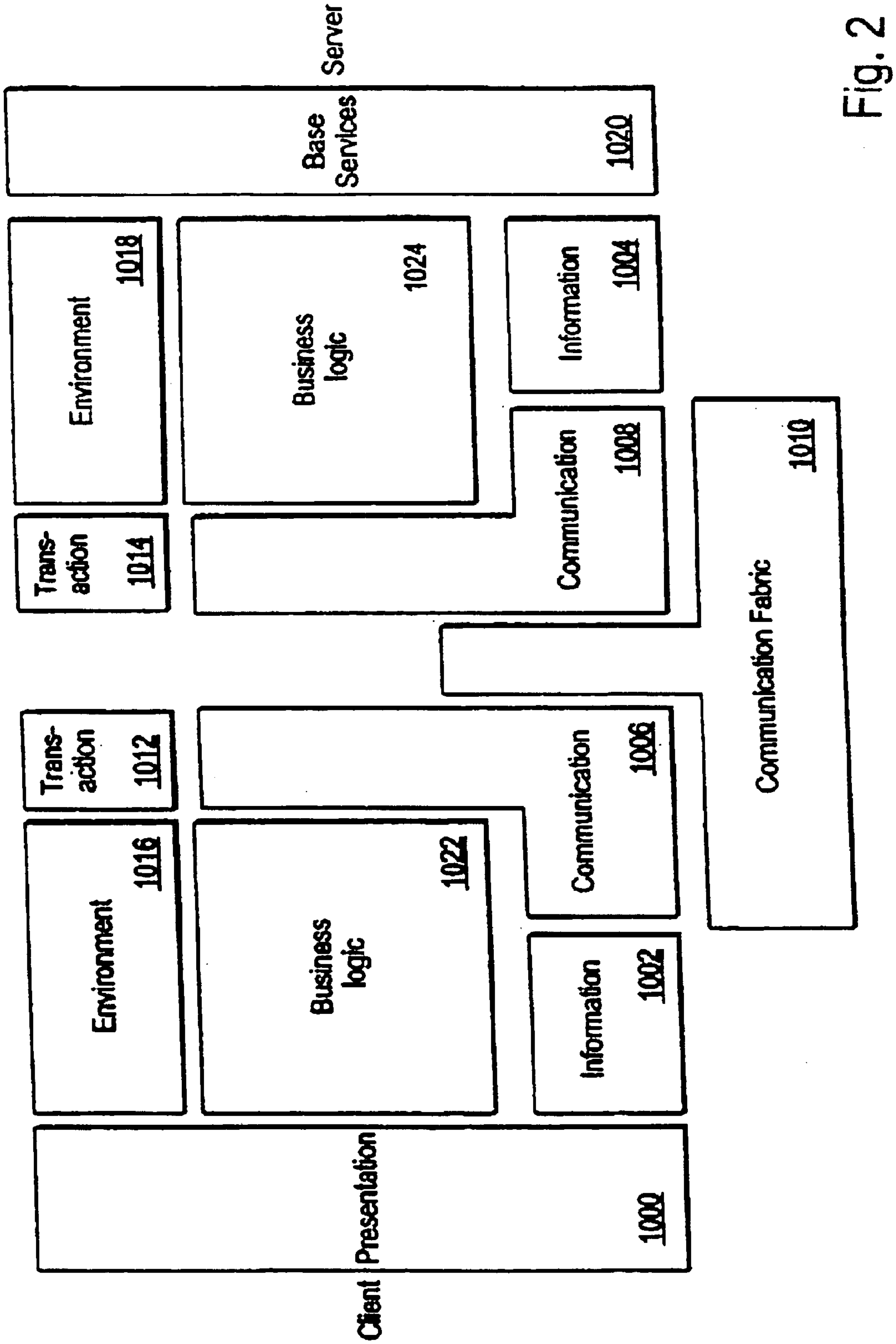
FIG. 2 illustrates the services of a Netcentric Architecture Framework in accordance with one embodiment of the present invention.
Figure 3:
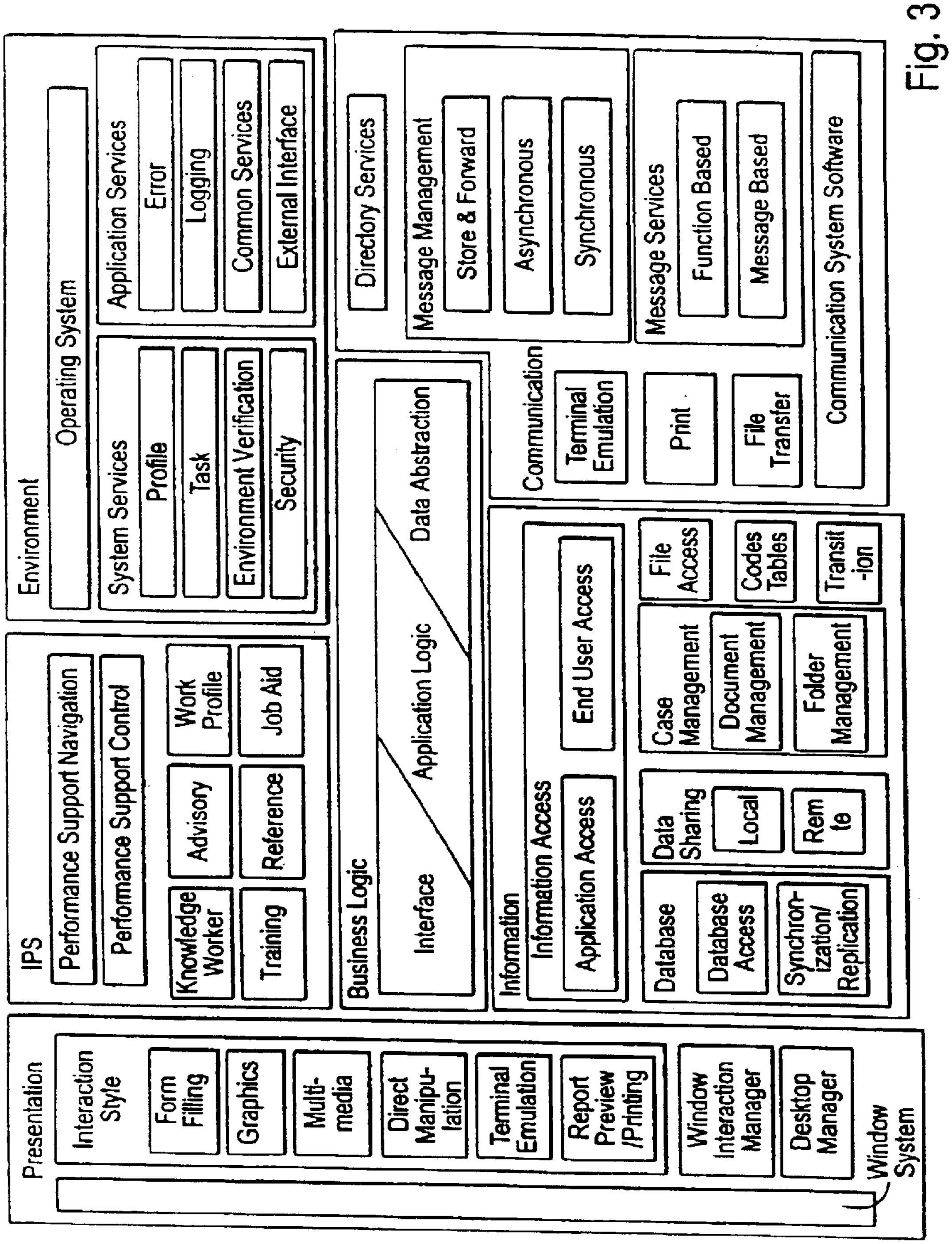
FIG. 3 is a detailed diagram of some of the components of the Netcentric Architecture Framework found in FIG. 2.
Figure 4:
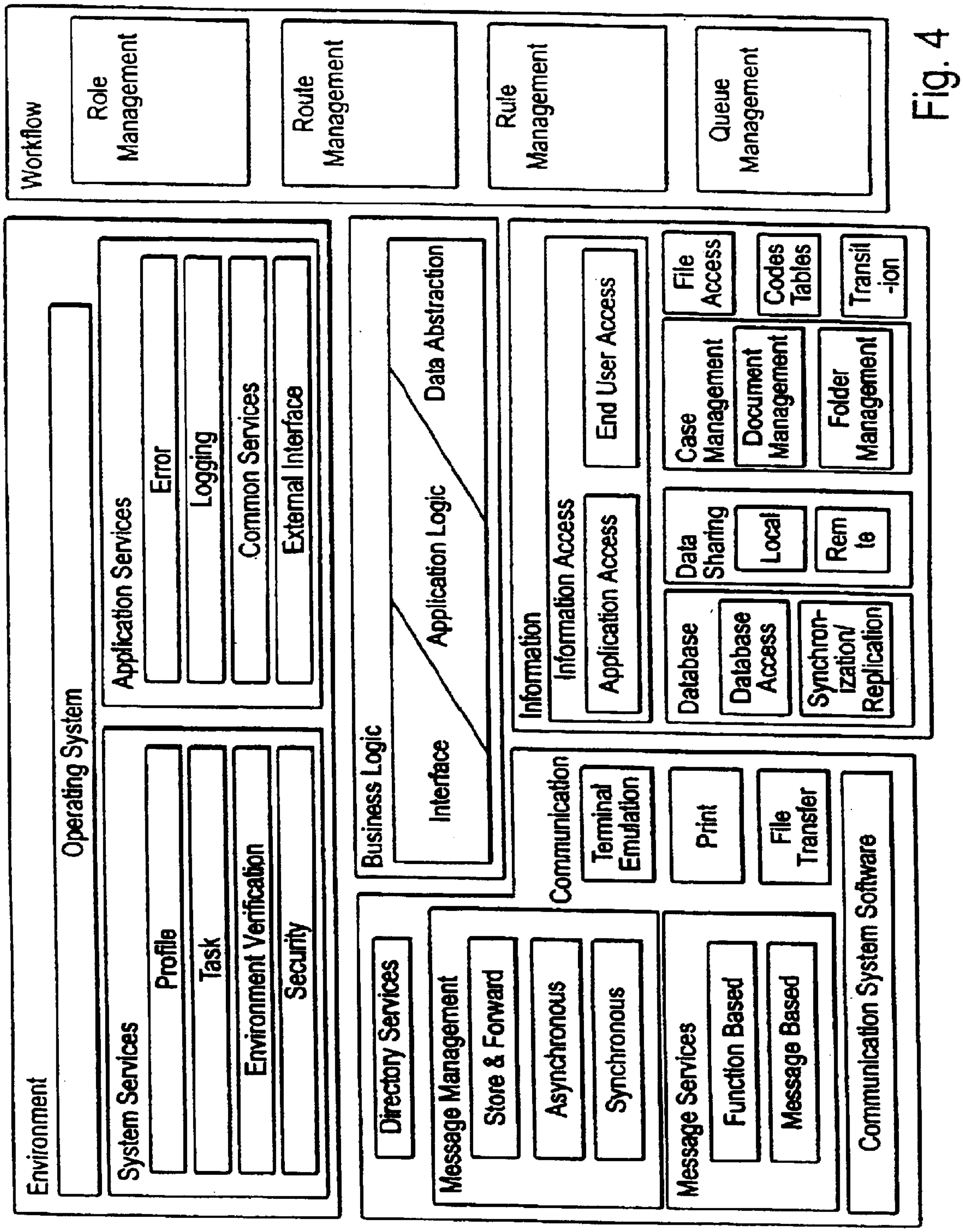
FIG. 4 is a detailed diagram of other components of the Netcentric Architecture Framework found in FIG. 2.

The Netcentric Architecture Framework identifies those run-time services required when an application executes in a Netcentric environment. As shown in FIG. 2, the services can be broken down into logical areas: Presentation Services 1000, Information Services 1002,1004, Communication Services 1006,1008, Communication Fabric Services 1010, Transaction Services 1012,1014, Environment Services 1016,1018, Base Services 1020 and Business Logic 1022, 1024. This framework is an evolution of the Client Server New Age Systems Framework and is useful for technical architects involved in the selection, development and deployment of technical architectures in a Netcentric environment. More discussion of each of these logical areas is provided below. See also FIGS. 3 and 4, which are detailed diagrams of the components of the Netcentric Architecture Framework found in FIG. 2.

Netcentric Computing Top 10 Points

- Netcentric computing represents an evolution—it builds on and extends, rather than replaces, client/server.
- Netcentric computing has a greater impact on the entire business enterprise, hence greater opportunity and risk.
- Definitions of Netcentric may vary. One is about reach and content.
- Netcentric is not just electronic commerce; it can impact enterprises internally as well.
- You can begin identifying Netcentric opportunities for clients today.
- There are three basic types of Netcentric applications: advertise; inquiry; and fully interactive.
- One can underestimate the impact of Netcentric on infrastructure requirements.
- Build today's client/server engagements with flexibility to extend to Netcentric.

Netcentric Computing Definition:

Netcentric Computing also called Netcentric Architecture, Netcentric Technology, etc. is an emerging architecture style which expands the reach of computing both within and outside the enterprise. Netcentric enables sharing of data and content between individuals and applications. These applications provide capabilities to publish, interact or transact. Netcentric represents an evolution of Client/Server which may utilize internet technologies to connect employees, customers, and business partners.

Client/Server vs. Netcentric Computing (NCC)

NCC is a new style of computing that expands on the technological base already provided by traditional client/server systems. Many of the traditional client/server design concepts and considerations still apply to NCC.

The important differences between client/server systems and NCC systems are:

- The way in which the application logic is distributed to clients is different in NCC and traditional client/server systems. In NCC systems, application logic can be packaged into components and distributed from a server machine to a client machine over a network. In traditional client/server systems, the application logic is split between the client and the server on a permanent basis; there is no dynamic distribution of application logic.
- The number of tiers in NCC and traditional client/server systems is different.
- NCC extends the traditional two-tier client/server architecture to a n-tier architecture.
- The client in NCC systems is different from a client in traditional client/server systems. The client in a NCC system is a standardized universal one; a NCC application can execute within a client that can run on multiple operating systems and hardware platforms. In traditional client/server systems, the client is custom-made for a specific operating system and hardware platform.
- The way in which NCC and traditional client/server systems can be extended and adapted is different. Components enable NCC systems to be adaptable to a variety of distribution styles, from a "thin client" to a "fat client". In comparison, traditional client/server systems, once designed and built, cannot be adapted for use on more than one computing style Tiers Similarly to traditional client/server architectures, Netcentric architectures support a style of computing where processes on different machines communicate using messages. In this style, "client" processes delegate business functions or other tasks (such as data manipulation logic) to one or more server processes. Server processes respond to messages from clients.

Business logic can reside on both client and server. Clients are typically PCs or Workstations with a graphical user interface running in a Web browser. Servers are usually implemented on UNIX, NT or mainframe machines.

A key design decision for a client/server system is whether it should be two-tiered or multi-tiered and how business logic is distributed across the tiers. In Netcentric architectures there is a tendency to move more business logic to the server tiers, although "fatter" clients are becoming more popular with newer technologies such as Java and ActiveX.

Two-Tiered Architectures

Two-tiered architecture describes a distributed application architecture in which business applications are split into front-ends (clients) and back-ends (servers). Such a model of computing began to surface in the late 1980s and is the prominent configuration in use today by companies which have attempted to migrate to client/server based computing.

Advantages

At a minimum, a two-tiered client/server architecture assumes that an application's presentation logic resides on the client and its data management logic resides on the server. This style of computing became attractive to early adopters of client/server because it clearly addresses the inadequacies of a character-based interface. That is, it allows PC-based clients to introduce a graphical user interface (GUT) into the application environment.

- Allows rapid development "out-of-the-box"
- Decreased communication overhead because of a direct connection (for a small number of users)
- Allows the distribution of the program's logic (application, presentation, data management)

Limitations of Two-Tiered Architecture

The use of two-tier tools has resulted in a defacto "client-heavy" or "fat-client" two-tiered model where the presentation and application logic resides on the client and data management resides on the server. In fact, the use of these tools "out-of-the-box" assumes the adoption of such a model. Unfortunately, such an architectural model falls short of addressing many important issues required of an enterprise-wide information architecture. This model of computing was actually developed for less-demanding PC environments where the database was simply a tool for decision support.

Limitations:

- Limited/cost prohibitive Scalability
- Limited availability
- Limited reliability
- Security Deficiencies
- Network/Database bottlenecks
- Low implementation flexibility
- Limited Asynchronous processing Three-Tiered or Multi-tiered Architectures Three-tiered architecture describes a distributed application architecture in which business applications are separated into three logical components: presentation and control, application logic, and data management. These logical components are "clean layered" such that each runs on a different machine or platform, and communicates with the other components via a network.

A three-tiered architecture is often enhanced by the integration of distributed transaction processing middleware. This model of computing is often termed the "enhanced" client/server model. Most Netcentric architectures use a three- or four tiered approach with a web server and potentially a separate application server layer.

In the enhanced client/server model, all presentation and control logic resides on the client, all application logic resides on multiple back-end application servers, and all data management logic resides on multiple back-end database servers.

Advantages

In contrast to mainframe and two-tiered client/server computing models, the principle advantage with a three-tiered enhanced client/server architecture is that it provides the benefits of a GUI application, but also provides a level of integrity and reliability found in mainframe centralized computing. That is, it will evolve to serve high-volume, high-integrity, and high-availability environments.

- Location and implementation transparency—The use of a transaction manager such as Tuxedo allows for service location independence.
- Distribution of logic to optimal resource—Since the application and database functions reside on their own physical devices, each can be optimally tuned for the work they perform.
- Database scaleable on throughput—In the enhanced three-tiered client/server model, client applications no longer connect directly to database servers. Instead, only application servers connect to the database servers.
- Security over service resources—With the application logic residing on back-end application servers, security over the applications is made possible at various levels.

- Redundancy and resiliency of services—A major disadvantage prominent in other models of computing is "single point of failure
- Optimization of personnel resources—Developers can be utilized for specific talents in each tier.
- Allows for asynchronous and standardized messaging—The enhanced client/server model is really a superset of the RPC-based function shipping model which provides features such as asynchronous, event-driven programming.
- Administration, configuration, prioritization—The use of a transaction manager enables servers to be added, removed, or restarted dynamically. This allows for very robust, scaleable, and flexible applications.

Disadvantages

Three-tier architectures are highly flexible. This flexibility comes with the cost of being more complex to implement.

Limitations:

- Additional tool (middleware) selection
- Longer implementation times
- Greater development costs associated with additional tier
- More complex planning
- Additional Skills
- Extra Hardware
- Greater complexity for maintenance, configuration management

Environment 1016,1018

Figure 5:
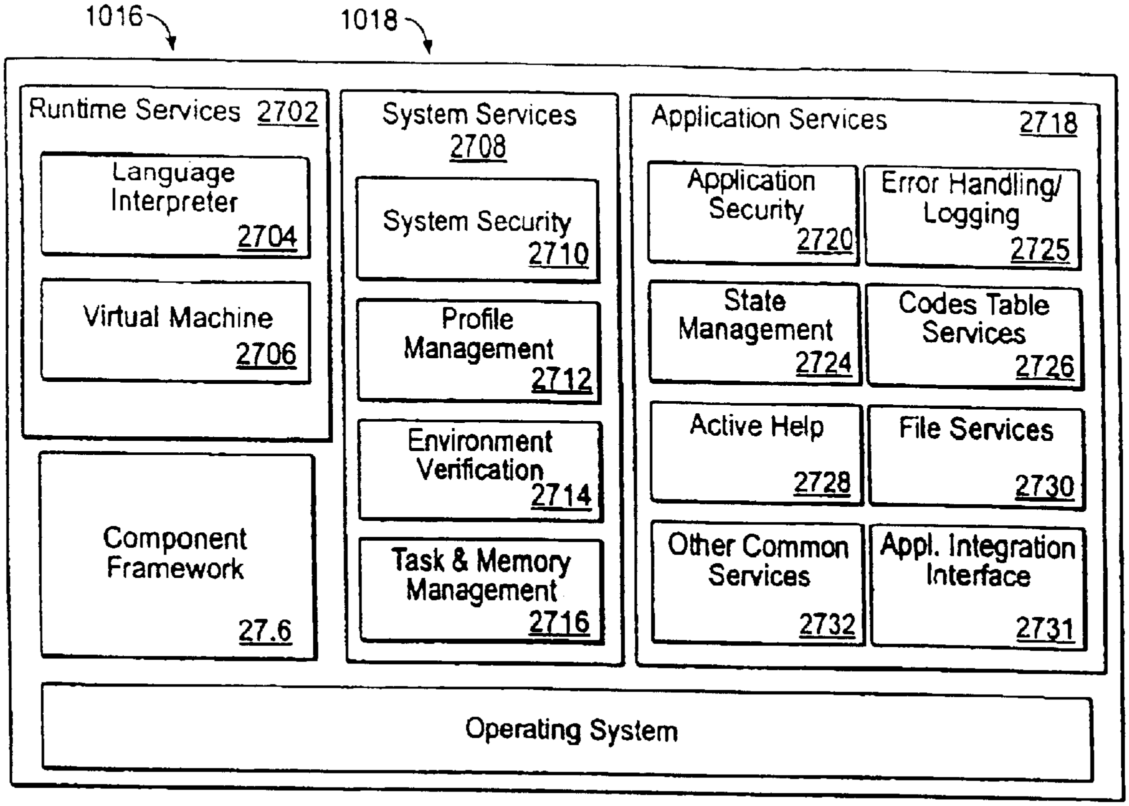
FIG. 5 illustrates various components of the Environmental Services of the Netcentric Architecture Framework.

FIG. 5 illustrates various components of the Environmental Services of the Netcentric Architecture Framework. Environment Services provide miscellaneous application and system level services that do not deal directly with managing the user-interface, communicating to other programs, or accessing data.

Runtime Services 2702

Runtime services convert non-compiled computer languages into machine code during the execution of a program.

Language Interpreter 2704

Language Interpreter Services decompose a 4th generation and/or a scripting languages into machine code (executable code) at runtime.

Possible Product Options

VBRUN300.DLL

- VBRUN300.DLL—runtime Dynamic Link Library that supports programs written in Visual Basic.

Virtual Machine 2706

Typically, a Virtual Machine is implemented in software on top of an operating system, and is used to run applications. The Virtual Machine provides a layer of abstraction between the applications and the underlying operating system and is often used to support operating system independence.

Possible Product Options

Java Virtual Machine; Smalltalk Virtual Machine

Virtual machines such as the Java virtual machine or the Smalltalk virtual machine implement their own versions of operating system services in order to provide the application with complete platform independence.

- Java virtual machine—software implementation of a "CPU" designed to run compiled Java byte code. This includes stand-alone Java applications as well as "applets" that are downloaded and run in Web browsers.
- Smalltalk virtual machine—runtime engine that interprets application code during execution and supports platform independence.

System Services 2708

Services which applications can use to perform system-level functions. These services include: System Security Services, Profile Management Services, Task and Memory Management Services, and Environment Verification Services.

System Security 2710

System Security Services allow applications to interact with the operating system's native security mechanism. The basic services include the ability to login, logoff, authenticate to the operating system, and enforce access control to system resources and executables.

Profile Management 2712

Profile Management Services are used to access and update local or remote system, user, or application profiles. User profiles, for example, can be used to store a variety of information such as the user's language and color preferences to basic job function information which may be used by Integrated Performance Support or Workflow Services.

Implementation Considerations

Is there a need for the application to have its own profile file?

All MS Windows based application maintain their own profile file (XXXXXXX.INI) that is used during application startup, execution, and shutdown. This is a flat text file that contains information that can be used by the application during various phases of execution. For example, if an application needs to connect to a database engine/server, it needs to know, during startup, various information like—database name, the server name, login ID, etc. Instead of hard coding all these information in the application executable, this information can be stored in the profile file for flexibility. In the future, if the database server name should change, this change only needs to be entered in the applications profile file. In some cases, it has been seen that this profile information has been hard coded in that applications executable itself. This will work, but, it makes the application more rigid with no room for any flexibility.

Environment Verification 2714

Environment Verification Services ensure functionality by monitoring, identifying and validating environment integrity prior and during program execution. (e.g., free disk space, monitor resolution, correct version). These services are invoked when an application begins processing or when a component is called. Applications can use these services to verify that the correct versions of required Execution Architecture components and other application components are available.

Implementation Considerations

In client/server applications, it may be necessary to implement Environment Verification Services to ensure that the client and server applications are of a compatible release level.

ActiveX framework provides services for automatic installation and upgrade of ActiveX controls. When using IE, i.e., Microsoft's Web browser, because of its integration with Windows OS, ActiveX controls can be automatically installed and automatically upgraded on the users machine without the developer adding any additional code.

Task and Memory Management 2716

Task & Memory Management Services allow applications and/or other events to control individual computer tasks or processes, and manage memory. They provide services for scheduling, starting, stopping, and restarting both client and server tasks (e.g., software agents).

Implementation Considerations

Memory management, the allocating and freeing of system resources, is one of the more error prone development activities when using 3GL development tools. Creating architecture services for memory handling functions can reduce these hard to debug errors.

Java removes, in theory, the problem of memory management, by providing a garbage collector; although, its implementation is not very efficient in current implementations of Java. Future releases of the Java VM promise a background-running garbage collector with significantly increased performance.

Application Services 2718

Application Services are miscellaneous services which applications can use for common functions. These common functions can apply to one application or can be used across applications. They include: Application Security Services, Error Handling/Logging Services, State Management Services, Help Services, and Other Common Services.

Application Security 2720

Besides system level security such as logging into the network, there are additional security services associated with specific applications. These include:

- User Access Services—set of common functions that limit application access to specific users within a company or external customers.
- Data Access Services—set of common functions that limit access to specific data within an application to specific users or user types (e.g., secretary, manager).
- Function Access Services—set of common functions that limit access to specific functions within an application to specific users or user types (e.g., secretary, manager).

Implementation Considerations

In the Netcentric environment, application security becomes a more critical component primarily because there are more types of users (e.g., employees, customers) and additional types of transactions (e.g., e-commerce, help-desks). In traditional client/server environments most users are employees of the company. In Netcentric environments there are typically also external users (e.g., vendors, registered users) and the general public. Usually, different types of users have different application security requirements limiting what data they can see and what functions they can execute. Also, new types of transactions such as verifying credit when doing e-commerce transactions also require additional application security services.

Error Handling/Logging 2722

Error Handling Services support the handling of fatal and non-fatal hardware and software errors for an application. An error handling architecture takes care of presenting the user with an understandable explanation of what has happened and coordinating with other services to ensure that transactions and data are restored to a consistent state.

Logging Services support the logging of informational, error, and warning messages. Logging Services record application and user activities in enough detail to satisfy any audit trail requirements or to assist the systems support team in recreating the sequence of events that led to an error.

Implementation Considerations

Error Handling

Primarily there are three types of errors: system, architecture and application.

- System errors occur when the application is being executed and some kind of serious system-level incompatibility is encountered, such as memory/resource depletion, database access problems, network problems or printer related problems, because of which the application cannot proceed with its normal execution.
- Architecture errors are those which occur during the normal execution of the application and are generated in architecture functions that are built by a project architecture team to isolate the developers from complex coding, to streamline the development effort by re-using common services, etc. These architecture functions perform services such as database calls, state management, etc.
- Application errors are also those which occur during the normal execution of the application and are generally related to business logic errors such as invalid date, invalid price, etc.

Typically an application is written using a combination of various programming languages (e.g., Visual Basic and C). Therefore, a common error handling routine should be written in a language that can be called from any other language used in the application.

Logging

Logging must be done, however to mitigate problems, centralize logs and create a standard, usable log format. 3rd party logs should be mapped into the central format before any analysis is attempted.

In a Netcentric environment, errors are rarely logged on the client machine (one exception may be for an intranet type application).

Logging can add much stress to a Web server and logs can grow very large, very quickly, so do not plan to log all errors—capture only those which are deemed necessary for processing exceptions.

State Management 2724

State Management Services enable information to be passed or shared among windows and/or Web pages and/or across programs. So lets say several fields in an application need to be passed from one window to another. In pseudo-conversational mainframe 3270 style applications passing data from one screen to another screen was done using Context Management Services that provided the ability to store information on a host computer (in this paper the term Context Management refers to storing state information on the server, not the client). Client/server architectures simplified or eliminated the need for Context Management (storing state information on the server), and created a need to store state information on the client. Typically, in traditional client/server systems this type of state management (i.e., data sharing) is done on the client machine using hidden fields, global variables, messages, files or local databases.

The popularity of the Internets HTTP protocol has revived the potential need for implementing some form of Context Management Services (storing state information on the server). The HTTP protocol is a stateless protocol. Every connection is negotiated from scratch, not just at the page level but for every element on the page. The server does not maintain a session connection with the client nor save any information between client exchanges (i.e., web page submits or requests). Each HTTP exchange is a completely independent event. Therefore, information entered into one HTML form must be saved by the associated server application somewhere where it can be accessed by subsequent programs in a conversation.

Advances in Netcentric technologies now offer additional options for implementing state management on both the client and server machines.

Possible Product Options

NetDynamics Inc. NetDynamics

NetDynamics Inc. NetDynamics

- NetDynamics provides built-in, developer-definable session and state management. The Persistence Engine (PE), part of the NetDynamics application server, stores all relevant information about a user. Everything from the WebID to the exact table row the user is currently viewing can be maintained in the PE. NetDynamics maintains state information on both the server and on the client page. Application state information is maintained by the application server, and local state information is maintained on the page. NetDynamics provides manipulatable state objects for both server and page state information.

Codes Table Service 2726

Codes Table Services enable applications to utilize externally stored parameters and validation rules. For example, an application may be designed to retrieve the tax rate for the State of Illinois. When the user enters "Illinois" on the screen, the. application first validates the user's entry by checking for its existence on the "State Tax Table", and then retrieves the tax rate for Illinois. Note that codes tables provide an additional degree of flexibility. If the tax rates changes, the data simply needs to be updated; no application logic needs to be modified.

Implementation Considerations

Is there a need for the codes table functionality?

Most applications need code/decode facility. For example, an application may need to store codes like—error severity codes, etc., stored in a table (may be a cached table) instead of in the executable itself. In some cases, where there is a small amount of information that needs to be stored in the codes table, the profile file (mentioned above) can be used instead of the codes table. But in cases where the codes table needs to be used quite extensively, then storing the code/decode information in the profile file will slow down the performance of the application because of the overhead of accessing flat files.

What basic services an architecture should provide in terms of managing/using codes/decodes functionality?

In cases where the application requires extensive use of codes table, the architectures Code/Decode component should provide the application developers with a set of API that can be used to use code/decode tables. This component should also provide the option of caching all or parts of the codes table in the application machines memory for easier and faster access.

Where should Code/Decode information be stored and maintained?

Code/decode information can be stored at any layer of an n-tier architecture—client, application server, or database. The decision will need to be based upon codes table size and number, information update frequency, and write-access to the client machine or device.

Active Help 2728

Active Help Services enable an application to provide assistance to a user for a specific task or set of tasks. Context-sensitive help is most commonly used in applications today, however this can imply more "active" support that just the F1 key. Typically, today's systems must be architected to include Help that is aware of both the user's environment, process and context, and in this sense can be called "active". Active Help services may include components like Wizards for walking a user through a new process, stored or real-time multi-media support, on-demand Computer Based Training, etc.

Other Common Services 2726

Catchall category for additional reusable routines useful across a set of applications (e.g., Date Routines, Time Zone Conversions, Field Validation Routines).

Implementation Considerations

Does the client operate in different date/time zone?

In most large scale distributed applications, the client and the server applications (or machines) are scattered over different time zones. This forces the client applications and the server hosts to deal with date and time zone conversions (like-CST to PST, etc.) In order to use or display their local time accurately. Most of the architectures provide a base set of APIs that can be used by the applications to convert the data/time as needed.

Does the system requires Customized date/time format for display purposes?

Many systems, for certain business reasons, need customized date and time formats for display and storage purposes. In order to do that, the architecture should provide a set of APIs that will allow the system to convert data and time from one format to the other.

Does the system deal with high database accesses?

As mentioned in the Codes Table Component, sometimes it is necessary to cache the data in the memory for faster access and less database hits. This a feature that some architectures provide as a set of memory management APIs to create the cache area in the client platforms memory for the data to reside.

Application Integration Interface 2734

An Application Integration Interface provides a method or gateway for passing context and control of information to an external application. The Application Integration Interface specifies how information will be passed and defines the interface by which other applications can expect to receive information. External applications in this context could include anything from Integration Performance Support systems to ERP systems like SAP or Peoplesoft to external custom applications that have been previously developed by the client.

Implementation Considerations

Where possible, Application Integration Interfaces should make use of the Component Model defined by the project to broker information (i.e. OLE/COM interfaces) as opposed to custom building data sharing modules.

Component Framework 2736

Component Framework Services provide an infrastructure for building components so that they can communicate within an application and across applications, on the same machine or on multiple machines across a network, to work together. COM/DCOM and CORBA described in Communication Services are the two leading component industry standards. These standards define how components should be built and how they should communicate.

Object Request Broker (ORB) services, based on COM/DCOM and CORBA, focus on how components communicate. Component Framework Services, also based on CORBA and COM/DCOM, focus on how components should be built. The currently 2 dominant Component Frameworks include:

1. ActiveX/OLE—ActiveX and Object Linking and Embedding (OLE) are implementations of COM/DCOM. ActiveX is a collection of facilities forming a framework for components to work together and interact. ActiveX divides the world into two kinds of components: controls and containers. Controls are relatively independent components that present well defined interfaces or methods that containers and other components can call. Containers implement the part of the ActiveX protocol that allows for them to host and interact with components—forming a kind of back plane for controls to be plugged into. ActiveX is a scaled-down version of OLE for the Internet. OLE provides a framework to build applications from component modules and defines the way in which applications interact using data transfer, drag-and-drop and scripting. OLE is a set of common services that allow components to collaborate intelligently.

In creating ActiveX from OLE 2.0, Microsoft enhanced the framework to address some of the special needs of Web style computing. Microsofts Web browser, Internet Explorer, is an ActiveX container. Therefore, any ActiveX control can be downloaded to, and plugged into the browser. This allows for executable components to be interleaved with HTML content and downloaded as needed by the Web browser.

2. JavaBeans—is Sun Microsystems proposed framework for building Java components and containers, The intent is to develop an API standard that will allow components developed in Java (or beans), to be embedded in competing container frameworks including ActiveX or OpenDoc. The JavaBeans API will make it easier to create reusable components in the Java language.

Other component frameworks include:

OpenDoc—CI Labs was formed in 1993 and created the OpenDoc architecture to provide a cross-platform alternative component framework—independent of Microsofts OLE. The OpenDoc architecture is constructed from various technologies supplied by its founding members—IBM, Apple and Word Perfect. The technologies include: Bento (Apples object storage model), Open Scripting Architecture (OSA—Apples scripting architecture) and SOM/DSOM (IBMs System Object Model/Distributed SOM). IBMs SOM architecture provides analogous services to that of Microsofts DCOM architecture.

OpenDoc provides an open compound document infrastructure based on CORBA. It uses CORBA as its object model for inter-component communications. OpenDoc architecture provides services analogous to those provided by OLE and OpenDoc components can also inter-operate with OLE components. The OpenDoc equivalent of an object is termed a part. Each type of part has its own editor and the OpenDoc architecture has responsibility for handling the communications between the distinct parts.

Supporters claim OpenDoc provides a simpler, more technically elegant solution for creating and manipulating components than does OLE. The drawback is that OpenDoc is not yet commercially proven, like OLE. Ironically, one of the more popular uses of OpenDoc tools is for creating and implementing OLE clients and servers. Because OpenDoc provides a more manageable set of APIs than OLE, it may be that OpenDoc gains initial acceptance as an enabler of OLE applications before becoming recognized as a complete component software solution itself.

ONE—Open Network Environment (ONE) is an object-oriented software framework from Netscape Communications for use with Internet clients and servers, which enables the integrating of Web clients and servers with other enterprise resources and data. By supporting CORBA, ONE-enabled systems will be able to link with object software from a wide array of vendors, including IBM, Sun Microsystems, Digital Equipment, and Hewlett-Packard. Netscape is positioning ONE as an alternative to Microsoft's Distributed Common Object Model (DCOM). ONE also complies with Sun Microsystems Java technology.

Implementation Considerations

An architecture that utilizes components brings many of the benefits of object orientation to applications. Component-based or document-centric applications are composed of intelligent components, each of which contains logic, possibly data and a set of well defined interfaces or APIs to the services they provide (e.g., a customer component or an Excel chart component). The similarities to object oriented are more than just coincidental. Component software is viewed by many as a more viable object approach focusing on larger grain of modularity and reuse.

Two important issues driving the decision around what should be a component are software re-use and software packaging. Software re-use will primarily stem from defining components at a level at which they can be re-used within the same application and across many applications. Although re-usable components can be at any level, more often they will probably be at an object level where they are more granular. Software packaging will be driven by defining components at a level at which they can be distributed efficiently to all users when business logic changes occur. If the application is large, perhaps it is better to package the application by breaking it up into process components such as customer maintenance, sales order maintenance, etc. So when a change to one of the processes occurs, only the component which contains that process needs to be distributed to client machines, rather than the whole application. For example, a developer can create an ActiveX control that will encapsulate the Employee Maintenance Process, which includes adding new employees, updating and deleting existing employees. This ActiveX control can be a part of an overall human resource intranet application. When the functionality within the Employee Maintenance Process changes, the next time the user accesses the human resource application from the Web browser, ActiveX technology will automatically download the latest version of the ActiveX control containing the most recent update of the Employee Maintenance Process to the client machine, if the client machine does not have the latest version.

Component Architectures Typically Employ of a Three-tier Component Architecture Utilizing the Following Three Types of Components:

User Interface, Process, and Domain. While these three component types may go by different names on different projects, they all follow the same basic pattern and are briefly explained below:

User Interface components typically contain nothing more than the logic required to manipulate input and output to the user. This can include input validation requiring no additional server data, as well as simple calculations associated with field display. In addition, logic associated with dynamically changing the display (e.g., a checkbox entry causes a field to become disabled) is placed here.

Process components typically contain the logic associated with business transactions performed on data. This is often the point where transaction commit/rollback occurs. These components are typically invoked by the User Interface components.

Domain components typically contain the logic associated with accessing and maintaining business entities, i.e., data. These components are usually invoked by Process components when requiring access to or manipulation of data. However, in addition to data access, these components may often be used to perform manipulations involving the processing of data within the domain of that component. For example, a Customer Domain component might be requested to determine if it's credit limit had been exceeded when provided with a new invoice amount.

Build vs. Buy

There is an explosion of components available in the market place and the ease of accessing and down loading components from the Internet; the decision to buy or build a component is as real as ever. In general clients expect more justification of a build decision v. a buy decision. Feel out the client and the expectations and requirements they may have.

Components are a viable option and should be researched, even includingeven simple UI controls available on the Internet. Look at market trends to determine which applications/components can meet the bulk of the system needs.

Operating System 2738

Operating System Services are the underlying services such as multi-tasking, paging, memory allocation, etc., typically provided by today's modem operating systems. Where necessary, an additional layer or APIs may be provided to gain either operating system independence or a higher level of abstraction for application programmers.

Possible Product Options

Microsoft Windows; Windows 95; Windows NT; Macintosh OS; OS/2; Unix and Java OS

PATTERNS

Overview of Patterns

Introducing Patterns

The goal of patterns within the software community is to create a body of literature to help software developers resolve common difficult problems encountered throughout all of software engineering and development. Patterns help create a shared language for communicating insight and experience about these problems and their solutions. Formally codifying these solutions and their relationships lets us successfully capture the body of knowledge which comprises one's understanding of good architectures that meet the needs of their users. Forming a common pattern language for conveying the structures and mechanisms of architectures allows us to intelligibly reason about them. The primary focus is not so much on technology as it is on creating a culture to document and support sound engineering architecture and design.

What is a Pattern?

A pattern is a named nugget of insight that conveys the essence of a proven solution to a recurring problem within a certain context amidst competing concerns. Patterns are a more formal way to document codified knowledge, or rules-of-thumb.

Patterns represent the codified work and thinking of our object technology experts. While experts generally rely on mental recall or rules-of-thumb to apply informal patterns as opportunities are presented, the formalization of the patterns approach allows uniform documentation and transfer of expert knowledge.

Patterns are not unique to object technology or even software development, having been invented by Christopher Alexander, a building architect. However, they have not been applied to other information technology development techniques. Thus, they are an exclusive feature of object technology. Furthermore, patterns are becoming widely accepted by the worldwide object community as an important element in successfully rolling out the technology, and enabling the maturation of software development as an engineering process.

Patterns are usually concerned with some kind of architecture or organization of constituent parts to produce a greater whole. Richard Gabriel, author of *Patterns of Software: Tales From the Software Community*, provides a clear and concise definition of the term pattern:

Each pattern is a three-part rule, which expresses a relation between a certain context, a certain system of forces which occurs repeatedly in that context, and a certain software configuration which allows these forces to resolve themselves.

As an element in the world, each pattern is a relationship between a certain context, a certain system of forces which occurs repeatedly in that context, and a certain spatial configuration which allows these forces to resolve themselves.

As an element of language, a pattern is an instruction, which shows how this spatial configuration can be used, over and over again, to resolve the given system of forces, wherever the context makes it relevant.

The pattern is, in short, at the same time a thing, which happens in the world, and the rule which tells us how to create that thing, and when one must create it. It is both a process and a thing; both a description of a thing which is alive, and a description of the process which may generate that thing.

In *Software Patterns*, Jim Coplien writes, a good pattern may do the following:

It solves a problem: Patterns capture solutions, not just abstract principles or strategies.

It is a proven concept: Patterns capture solutions with a track record, not theories or speculation.

The solution isn't obvious: Many problem-solving techniques (such as software design paradigms or methods) try to derive solutions from first principles. The best patterns generate a solution to a problem indirectly—a necessary approach for the most difficult problems of design.

It describes a relationship: Patterns don't just describe modules, but describe deeper system structures and mechanisms.

The pattern has a significant human component . . . . All software serves human comfort or quality of life; the best patterns explicitly appeal to aesthetics and utility.

Component-Based Development

Introduction to Component Based Development

Component Systems Model—how the Business Works

Component-orientation is a strategic technology that may significantly impact a user's practice and clients. Component technologies are a natural evolution from object-oriented systems providing a more mature way of packaging reusable software units. Object-oriented systems more closely support business integration framework for solution delivery by shifting design focus away from an underlying technology toward a company's business conduct and functional behaviors. Business entities are represented as objects, which package data and functional behavior. This is in distinct contrast to traditional development approaches that maintain a ubiquitous split between functional behaviors and data.

Object-orientation has accelerated into the take-up curve. All of the major commercial component models are object-oriented. In addition, all of the major vendors have adopted the "Unified Modeling Language" (UML) as a standard notation for describing object models. A tremendous reservoir of knowledge capital, practice aids and starter kits related to object and component technology can be found on the Knowledge Exchange.

More and more, users are asking for assistance to deploy Netcentric eCommerce applications based on components. These applications are frequently based on object-oriented languages like Java, Visual Basic and C++.

Objects are an easy metaphor to understand and manage. There are still substantial risks involved, particularly because component- and object-orientation has a pervasive impact on areas as broad as analysis and design, planning, and development tools.

Component-Based Overview

Component Technology Impacts Most Aspects of Development

Component and object technology impacts most aspects of software development and management. Component technology is a new technology and a driving influence in the evolution of object-oriented (OO) methodologies. The Management Considerations section of the Introduction to Component-Based Development uses the Business Integration (BI) Model to discuss the impact of OO, including:

- Strategy and planning with a long-term view towards building reusable, enterprise software assets.
- Technology and architecture approaches for building cohesive, loosely coupled systems that provide long-term flexibility.
- Processes that shift analysis/design techniques from functional, procedural decomposition to business process modeling. These techniques are then used to decompose the system into domain objects and processes.
- People and organization strategies that emphasize greater specialization of skills within structures that support inter-team collaboration.

Balancing tradeoffs is key to applying components for mission-critical systems

Figure 6:
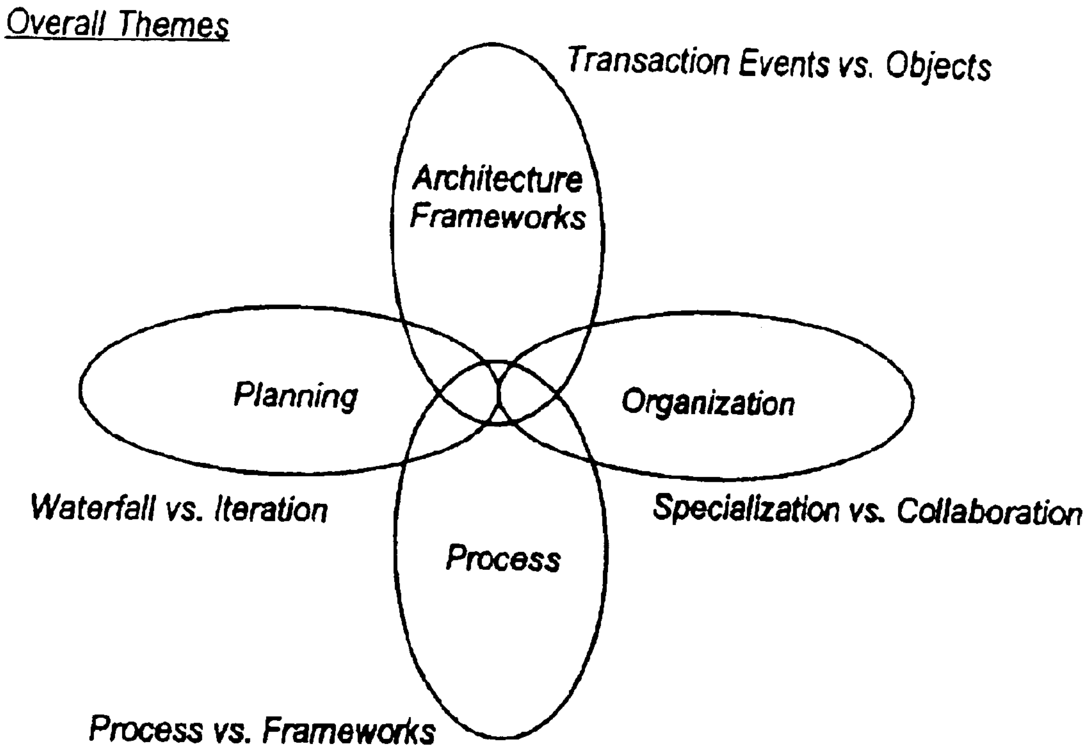
FIG. 6 illustrates a relationship between major themes that impact aspects of software development and management.
Figure 7:
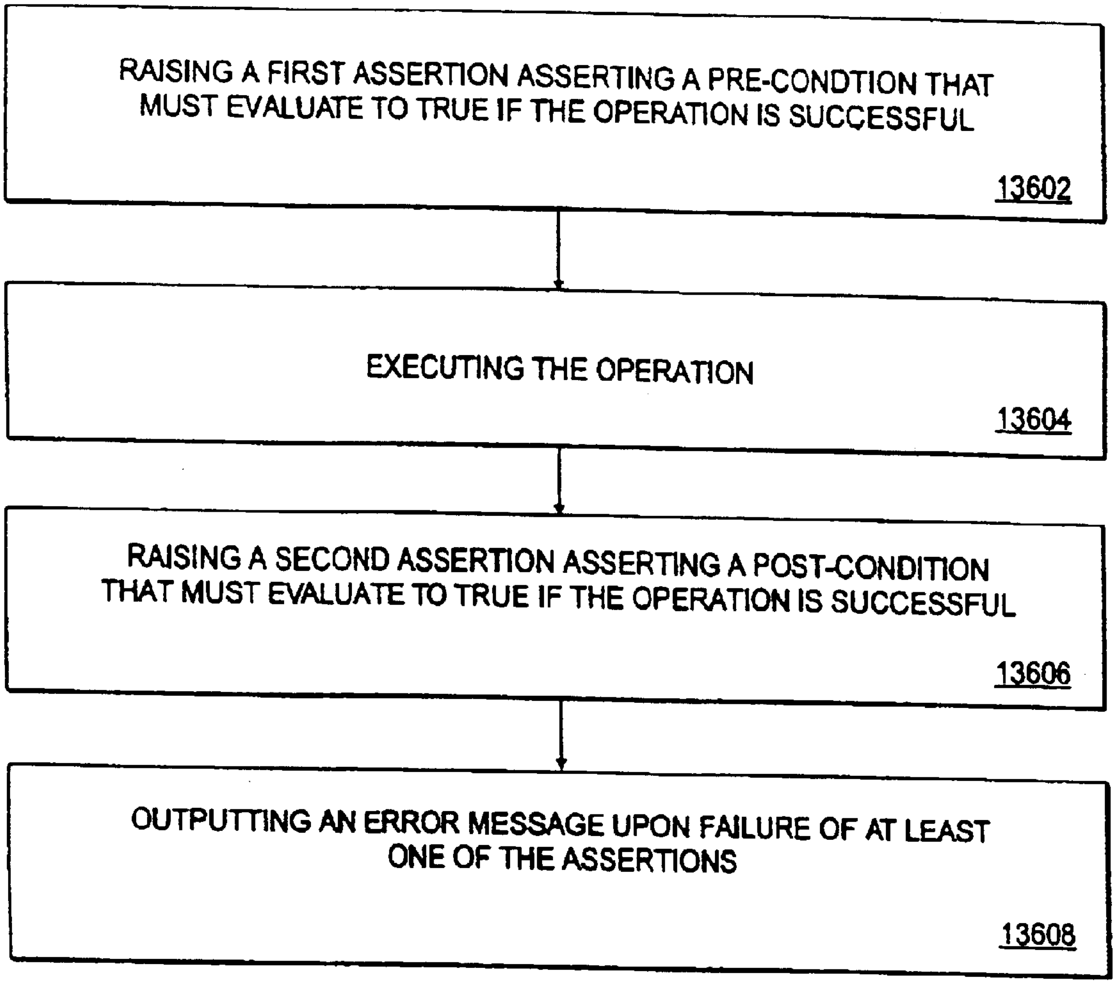
FIG. 7 illustrates a flowchart for a method for testing successfulness of an operation having pre-conditions and postconditions that must be satisfied for the operation to be successful in accordance with an embodiment of the present invention.

Tradeoffs are an important theme. Experience with large, mission-critical systems has shown that the most complex issues require strategic tradeoffs between quality, cost, and time. These tradeoffs usually involve interdependent considerations between strategy, technology, process, and people. See FIG. 6 which illustrates a relationship between major themes. For example, how should an architecture be tailored to effectively support a specific methodology, for a given organization's skill set? Competing tensions also cloud decisions at a more detailed level. For example, how should an architecture be customized to better support performance, at the potential cost of increased coupling between components?

Many of these considerations have been addressed over the last few years. Most published literature continues to focus on narrow technology issues, such as programming techniques or generic methodologies, such as analysis and design approaches or notation. Still, a growing number of publications and vendor strategies attack the enterprise needs within on-line netcentric execution models. Real-world, client solutions involve making pragmatic decisions, in which compromise occurs at the intersection of the four major OO themes. Experience with many component client projects in diverse industries uniquely positions a user to effectively address these complexities.

Management Considerations Overview

The Management Considerations section discusses the key benefits, risks, and issues introduced by a component engagement. Key topics include:

- Managing risk in balancing tradeoffs between strategy, people, process, and technology
- Considering issues related to configuration management, testing, and performance of object systems
- Addressing the component development learning curve
- Differences between development architecture considerations leveraging the advantages of a component industry.

The Management Considerations section also address issues not unique to Component technology, including:

- Estimating, planning, and managing iteration
- Organizing and managing to achieve reuse of both architecture and business logic Netcentric Patterns Overview Netcentric Patterns Focus on Application Frameworks Netcentric Patterns focus on how to design and leverage application frameworks, which are pieces of reusable application architecture that provide a highly configurable, flexible and maintainable system. They are aligned with SAF service layers. Alignment with SAF makes the patterns easier to grasp the context for which they are solving problems.

There was no mandate to express implementation within any given particular OO language. Java and Visual Basic have increased in popularity over the last few years and C++ continues to be a solid foundation on which to build many types applications. In addition, some implementations chose the design syntax of UML. One should see the value of the pattern regardless of the implementation personality. Nowhere has this been more strongly demonstrated than in the Eagle Starter Kits. Here, the Eagle Architecture Specification has been documented in patterns and implemented in Visual Basic, Java, C++ and a host of execution environments within these language offerings. The power is in the reusable design patterns.

For a high-level description of the context for the patterns within a service layer of SAF, click the title of the section. Please refer to the SAF for more detailed descriptions of the service layers. From the Frameworks Main Page, under Framework Extensions, the "Component Technology Extension" describes, in the context of the Netcentric Architecture framework, the additional, specialized, architecture services that are required when building a system using component technologies.

Environment Services (1016)

Environment Services provide miscellaneous application and system level services that do not deal directly with managing the user-interface, communicating with other programs, or accessing data. These services are divided into:

- Operating System Services
- Runtime Services
- Version Management
- Licensing Services
- Error Handling/Logging Services
- Properties
- Task and Memory Management
- Security "Miscellaneous services" should not be interpreted as "less important services." In fact, they are vitally important. Developers are more productive when they are not required to be concerned over logging and auditing, error handling and context issues. Obtaining the freedom to largely ignore these issues requires close attention to providing facilities which are well thought out and meld into the application structure.

Despite the pervasive demands of environmental considerations, many forms of documentation largely gloss over these issues. For example, many times when reading API documentation we find authors disclaim the fact that no error handling or "programming by contract" is shown within the code examples to improve readability. Yet, getting error handling right is key to stability in the execution environment. Programming by contract with the use of preconditions and post-conditions is perhaps the most aggressive style of programming known to date to assure correct programs. Assertion, Exception Hierarchies, Exception Response Table and Polymorphic Exception Handier tackle these problems vigorously by helping to define clearly how to solve some of these key kernel application architecture considerations. The Exception patterns provide a blueprint illustrating how architectural issues can be abstracted into a service level component so that the impact to the application code is minimal.

A demanding issue in distributed systems is gathering and using trusted information about the clients interacting with the systems. In earlier generations of systems the number of users was a fairly precise calculation—just count the number of workstations which could potentially connect to an application. Information about the users was also a fairly simple matter since they connected directly to the resources from which they were requesting services. Today, with clients offering web services within n-tiered architectures this is no longer easily predictable. In addition, requirements to support these less predictable numbers of users and to have a personal "one-to-one" relationship with them is key to many web strategies. The LoadBalancer and UserContext pattern offer some help in this area. The former addresses strategies for ensuring maximal leverage of the system resources and services and the latter helps in addressing the issue of maintaining state and context system state is in error. How can operations check for these errors so that the handling of these critical errors are consistent across the application?

Methods typically obtain and return a value, set an attribute based on a passed in parameter, or modify the state of the application based on some complex business rule or ruleset. While there is always some expected result of the invocation of an operation, there are also other, less expected possibilities. The provided parameters may not be within the expected range, thereby causing an error. A communications failure could cause the operation to fail to complete or, worse yet, return incorrect data or leave the system in an inconsistent state.

Figure 8:
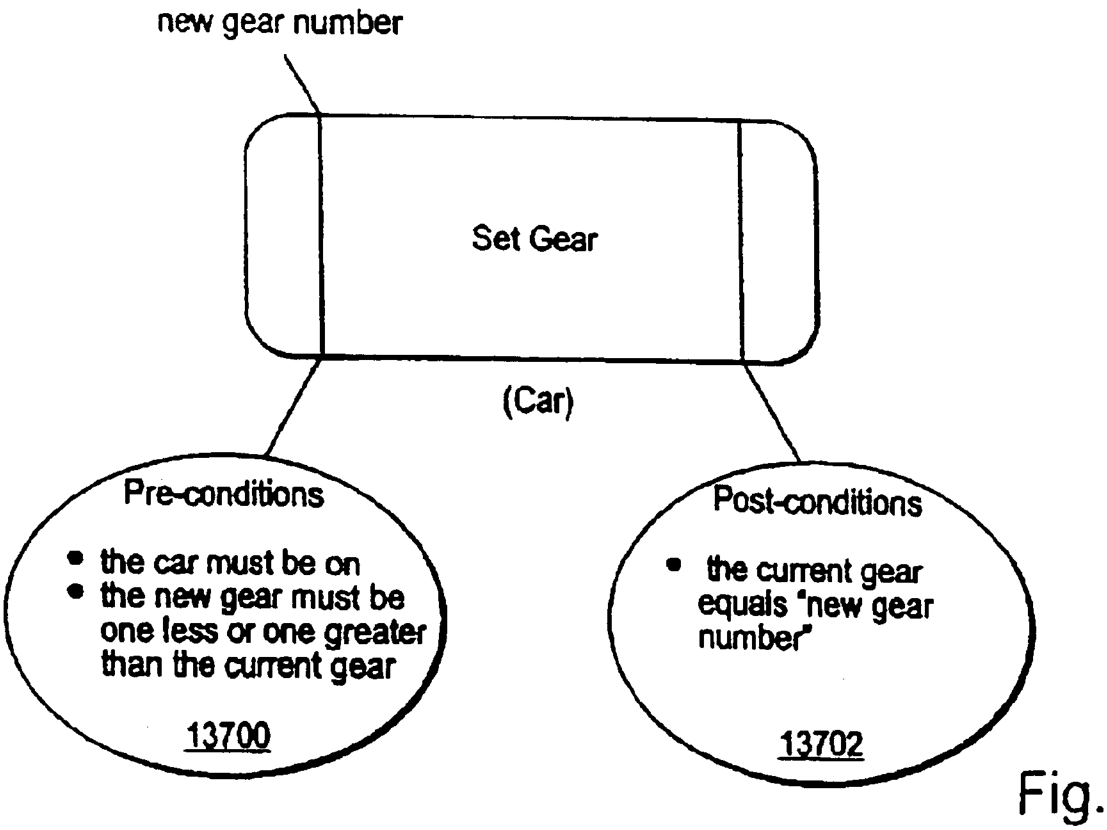
FIG. 8 illustrates an operation diagram depicting an example of pre-conditions and post-conditions.

Any complete design determines that some formal specification is required to ensure operations complete correctly. This specification is most often in the form or pre- and post-conditions. These conditions define a set of logical expressions that must hold true for the operation to begin and end as expected. These conditions are usually defined during the Design Phase of development. An example is shown in the Operation Diagram below:

FIG. 8 illustrates an operation diagram depicting an example of pre-conditions 13700 and post-conditions 13702.

The conditions, in short, define the contract for the method. All of these pre-conditions must hold true before an operation's execution and all of the post-conditions must hold true after an operation's execution. Only then is the operation said to be successful. If any of these conditions fail, a critical error has occurred. The system must assume it is in an inconsistent state and cannot continue processing.

It is expected that the system programmers will check for pre- and post-conditions systematically in the operations they are coding. This seemingly simple requirement becomes non-trivial when some issues are considered:

How can multiple developers implement these checks in a consistent manner?

Some condition checks may be expensive to complete (database and remote component queries). How can these be turned on and off to meet performance expectations? Problem with deferred evaluation; see below.

How can the exceptions raised when a condition check fails be handled in a consistent manner throughout the system?

Therefore, a type of object should be developed to represent a check against an operation's conditions. This generic class of objects is known as an Assertion. Application developers should then raise Assertions throughout the system to check the correctness of the code and system state.

An Assertion accepts conditions that must always evaluate to true. If any of these conditions ever fail, a critical error has occurred and the system should shut down. Preconditions and post-conditions are good examples of the type of conditions that should be asserted during an operation's execution.

The Assertion class is passed a condition that, if evaluated to be false, raises the appropriate errors and shuts the system down. The purpose of this pattern is to formally recognize the pre- and post-conditions of a method in the actual code rather than through developer comments. By implementing an assert( ) method on a common superclass, the interaction with the Assertion class can be hidden from the functional developer. An example of the use of assertions is shown below:

```
public Customer createCustomer(int newCustomerNumber)
{
    Customer newCustomer null;          // declare the new customer
    this.assert(newIdentifier > 0);// pre-condition, a customer's
                // identifier must be greater than
                // zero
    // code to create the customer
    this.assert(newCustomer != null);    // post-condition, the customer
was
                // created
    return newCustomer;
}
```

Assertions can be raised with descriptions and parameters. A description can help to identify where the Assertion failed and a parameter list can help to identify why the Assertion failed.

Assertions should be raised at the beginning and end of every operation. Prior to raising the Assertion, a check should be made to see if it appropriate to raise one (if assertions are enabled, if performance sensitive assertions are enabled). This can be accomplished by querying the Assertion class for its state before checking the assertion:

```
if (!Assertion.isPerformanceSensitive( ))
{
        // assert!
}
```

All operations will have both pre- and post-conditions. Even in cases where an operation defines an input parameter as something as broad as an integer, it is doubtful that all integers are acceptable to the operation. In this case, an Assertion should be raised to check if the parameter is in the appropriate range.

A "top-level" error handler should be defined to catch all AssertionExceptions and handle them in a clean and consistent manner. This should include reporting the assertion failure and shutting down the system following an orderly procedure.

It is important to note the difference between assertions and standard error-handling. Assertions are condition checks that can be turned on and off during runtime whereas standard error handling is always enabled. This is because assertions must always be true. The burden is on the testing process to catch all failed assertions. Thus, a failed assertion should simply never happen in deployed code. However, exceptions can happen, and therefore cannot simply be turned off.

Benefits

- Ease of Error Identification. Many error are caused by invoking an operation with improper data (parameters). By formalizing these conditions, it is very obvious is an error was caused by bad data or bad code.
- Correctness. Properly placed assertions assure that the system is in a correct state and responses can be trusted. Assertion checking complements, but does not replace, a comprehensive testing program. The responsibility remains with the designer to identify the correct conditions to assert.
- Consistency. All checks will be made and handled in a similar fashion.
- Control. The enabling and disabling features of the Assertion allows an operations controller to determine when and what checks should be made at runtime rather then development time.
- Flexibility. All handling and clean-up of incorrect assertions is located in one place making changes to this logic much easier to implement.
- Readability. Polices concerning how assertions are actually thrown and handled is not in the functional code.
- Documentation. The code actually documents the design assumptions. This can also be used by documentation generators which read through the code.

The Assertion class can be defined as shown in the following specification:

Class Assertion
  void raise(boolean condition) throws AssertionException
  void raise(boolean condition, String description) throws
AssertionException
  void raise(boolean condition, Vector parameters) throws
AssertionException
  void raise(boolean condition, Vector parameters, String description) throws AssertionException
  boolean isEnabled( )
  boolean isPerformanceSensitiveEnabled( )
Class AssertionException extends Exception One possibility on how to handle the enabling and disabling of assertion checking would be to have two possible types of Assertion class. One which implements the actual assertion-checking logic and another which only implements no-ops. The Assertion instance is then obtains through an AssertionFactory which can be set as to which of the two types to distribute. These settings are determined at runtime.

It should also be noted that in Java, the exception that is thrown should be a generic run-time exception that doesn't need to be caught by the method or mentioned in the method's throw clause.

Collaborations

Factory

Distributed Garbage Collection

Figure 9:
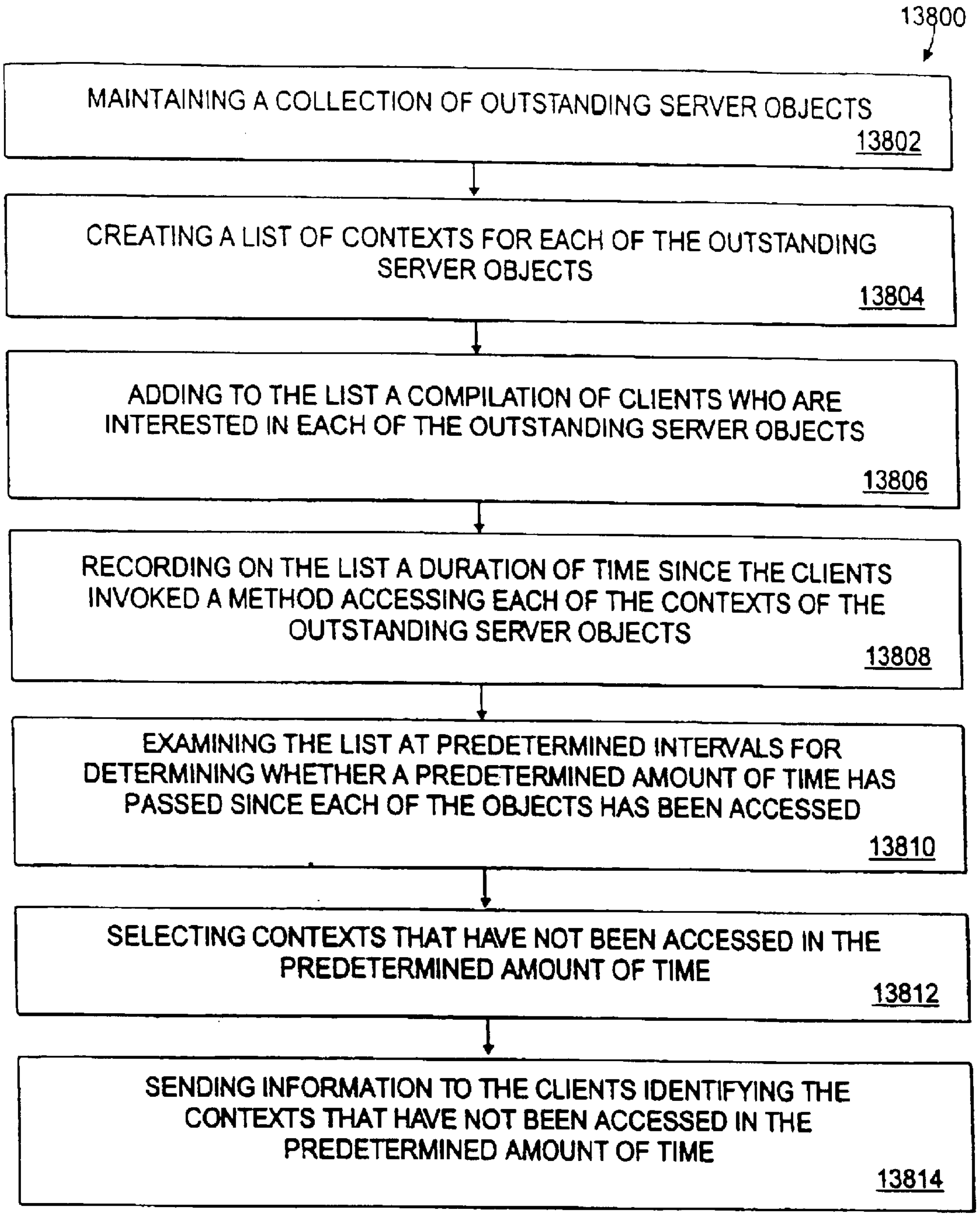
FIG. 9 illustrates a flowchart for a method for detecting an orphaned server context in accordance with an embodiment of the present invention.

FIG. 9 illustrates a flowchart for a method 13800 for detecting an orphaned server context. A collection of outstanding server objects is maintained and a list of contexts is created for each of the outstanding server objects in operations 13802 and 13804. A compilation of clients who are interested in each of the outstanding server objects are added to the list in operation 13806. Recorded on the list in operation 13808 is a duration of time since the clients invoked a method accessing each of the contexts of the outstanding server objects. The list is examined at predetermined intervals for determining whether a predetermined amount of time has passed since each of the objects has been accessed in operation 13810. Contexts that have not been accessed in the predetermined amount of time are selected in operation 13812 and information is sent to the clients identifying the contexts that have not been accessed in the predetermined amount of time in operation 13814.

After waiting a preselected amount of time for receiving a response from one of the clients, the context may optionally be deleted if a response from one of the clients is not received within the predetermined amount of time. Also, a response may optionally be received from one of the clients requesting that one of the contexts be maintained. In such a situation, upon receipt of the response, a time the context was last updated may be updated to a current time.

As a further option, a queuing delay may be accommodated for a response from the clients. Also, each of the clients may maintain a collection of all objects the client is interested in. The clients then may send requests to keep alive any objects the clients are currently interested in.

A client requests a server process but due to abnormal circumstances fails to clean up. How is the orphaned process detected and removed?

In the design of a stateful server, the LUW Context pattern facilitates the server process constructing domain objects at the request of the clients and maintaining these objects within a given context. Domain objects are entered into a registry with their appropriate context which the server maintains and updates when a request is received to create or delete an object. Each time a context is accessed then a notification is broadcast to the registry, regardless of a state change. With a simple context management, each time a context is referenced by a client a reference counter is incremented and similarly decrements when the reference is destroyed. Once the reference count returns to 0 then the context can be removed from the registry.

If the context is not explicitly deleted by the client then it will remain in the registry as the server has no way of detecting that the context is orphaned.

Even if the client application is rigorously designed to ensure all redundant contexts are deleted, an abnormal client event may result in its termination leaving an orphaned server context.

Figure 10:
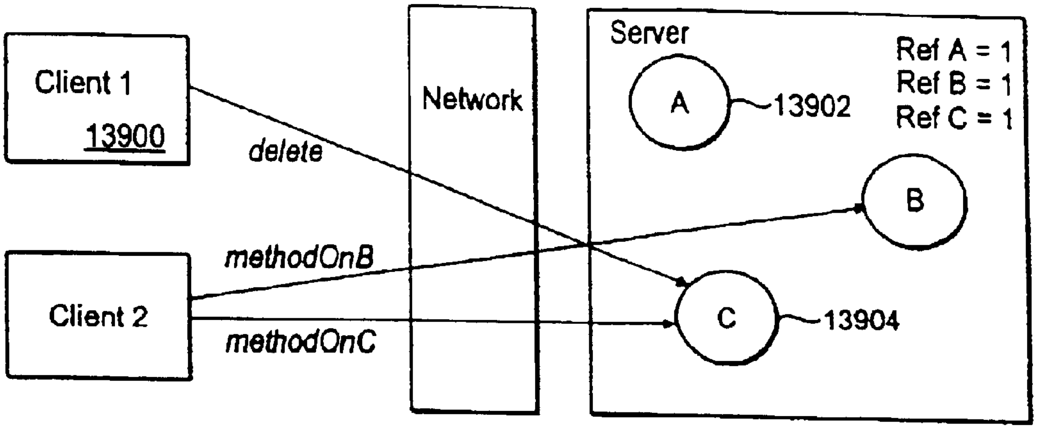
FIG. 10 illustrates a Client 1 that has instantiated A and C, deletes C but fails to delete A.

FIG. 10 illustrates a Client 1 13900 that has instantiated A 13902 and C 13904, deletes C but fails to delete A.

The server still has a reference counter greater than 1 even though the client is no longer interested.

Therefore, Distributed Garbage Collection should be implemented to ensure that orphaned server contexts are deleted on the server. In the registry for the Garbage Collection the server maintains a collection of outstanding server objects and for each object a list of its contexts, the clients currently interested and the duration since a method was invoked upon a given context by a client. Periodically this list is examined to establish if any of the objects have not been accessed for some configurable time and are candidates for reaping. So, for example, a value of 5 minutes could serve as a default poll event or keep alive interval. If a candidate for a orphaned server process is identified then the clients are sent a message, requesting if they are still interested in the context. This might be performed by publishing an "is anyone interested" message to the registered clients to establish if anyone is interested in the object in its assigned context or by asking the clients explicitly depending on the nature of the architecture.

The client side also maintains a collection of all of the objects that it is interested in. When it is queried, it instructs the server to keep alive any objects it has an interest in for which a query has been received.

Figure 11:
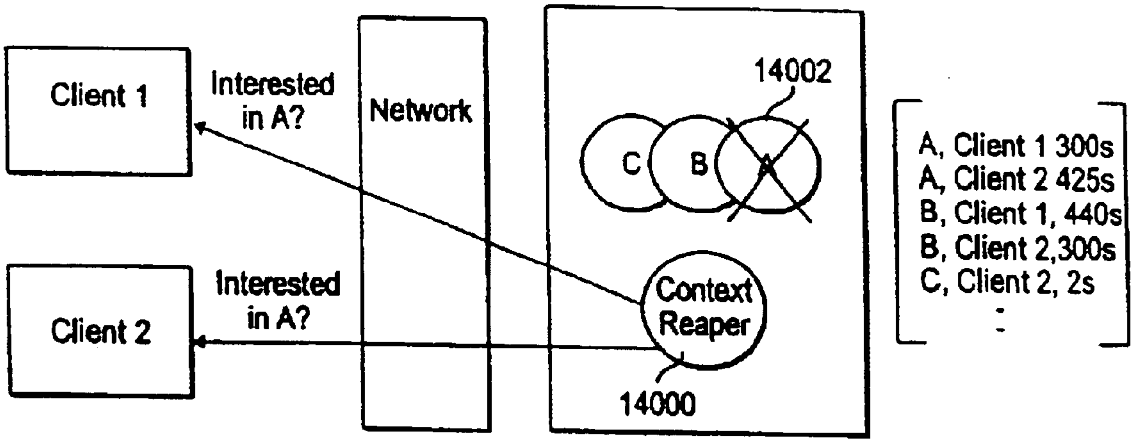
FIG. 11 illustrates a GarbageCollector requesting for interest in context A.

FIG. 11 illustrates a GarbageCollector 14000 requesting for interest in context A 14002. No responses are received from any clients so the server assumes it is orphaned and deletes it.

If the period configured for a client to respond expires then the context is deleted. This accounts not only for an abnormal termination of the client but for failure of the client application to clean up. However, if a request is received from a client to maintain a context then the time the context was last accessed is updated to the current time and it remains in the Garbage Collection registry.

Figure 12:
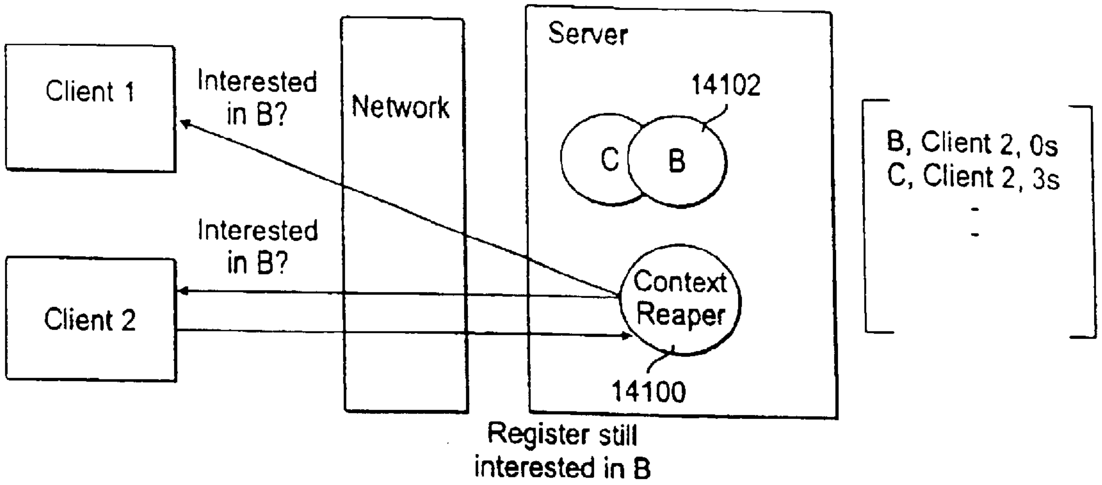
FIG. 12 illustrates a GarbageCollector requesting for interest in context B.

FIG. 12 illustrates a GarbageCollector 14100 requesting for interest in context B 14102. Client 2 registers interest so the reaper updates the access time stamp and maintains B.

Benefits

Cleanup on the Server. Reduces the amount of redundant resources on the server to a minimum. This is especially important if a stateful component is held in a transaction by a client and the architecture prevents additional clients from accessing it, e.g. with BEA's M3.

Performance. Ensures that only the required contexts are maintained on the server, minimizing the work that the server is required to do, especially during the cleanup process at the end of a LUW.

Centralization. The collector has a central view over all of the contexts that are currently accessed by all of the clients within a given context. This simplifies the persistence of a context at the end of processing.

In order to prevent potential race conditions the client must be given sufficient time to respond to the keep alive message from the server before the context is deleted. Typically the client has a separate listener for upward messages originating at the server, so queuing is not an issue at the client end. However, a server is more likely to queue on the receiving end, especially in a system with high message rates. Unless there is a dedicated listener on the server it must be configured to accommodate for any queuing delay on receipt of the client response.

Collaborates With

Context Pattern Language describes the architecture that is required before the Distributed Garbage Collection is required.

Variation Of

Java Shared Namespaces with distributed garbage collection.

Objectstore PSE WeakArrays.

Exception Hierarchies

Figure 13:
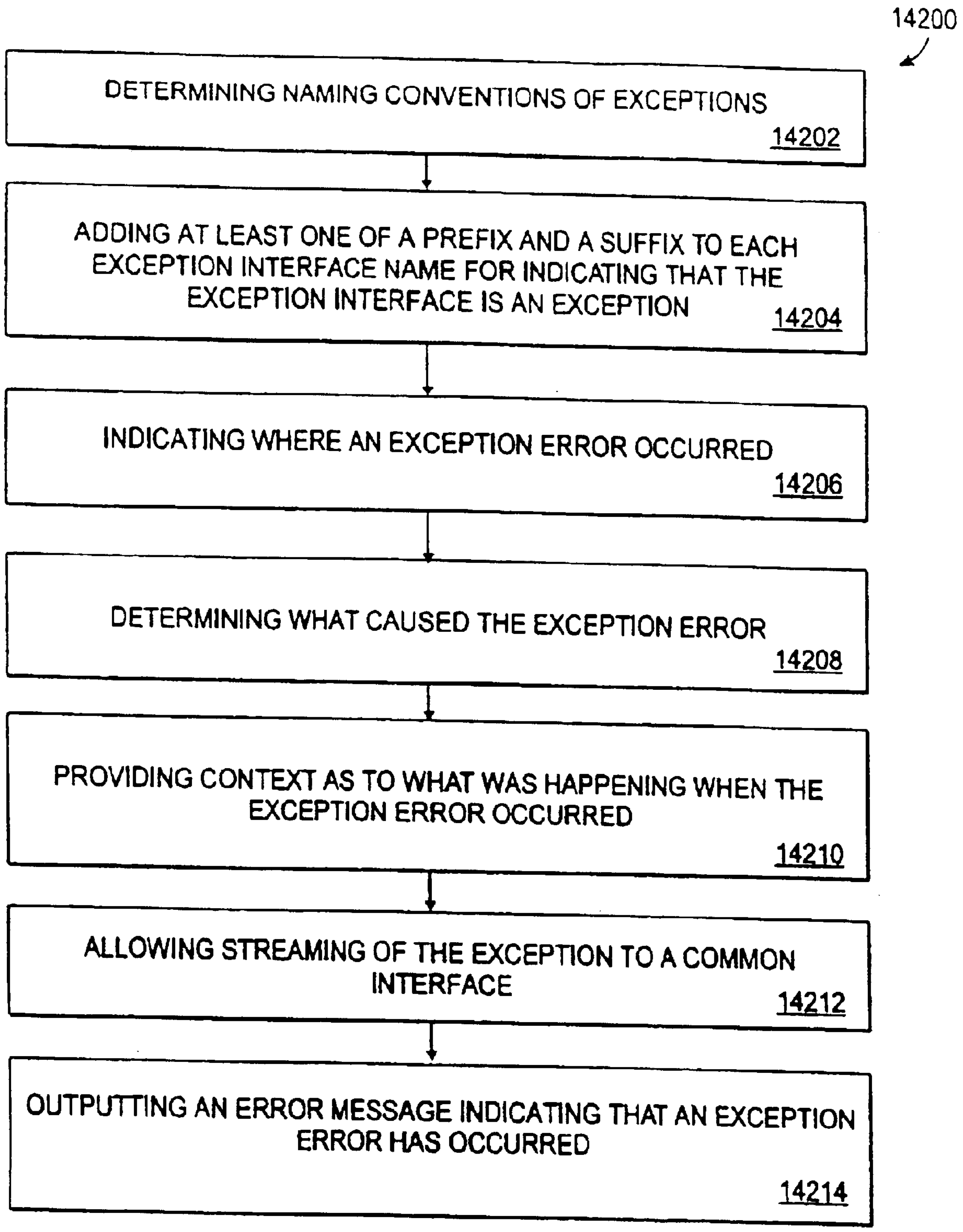
FIG. 13 illustrates a flowchart for a method for creating a common interface for exception handling in accordance with an embodiment of the present invention.

FIG. 13 illustrates a flowchart for a method 14200 for creating a common interface for exception handling. Naming conventions of exceptions are determined in operation 14202. A prefix and/or a suffix is added to each exception interface name in operation 14204 for indicating that the exception interface is an exception. In operations 14206 and 14208, where an exception error occurred is indicated and a determination is made as to what caused the exception error. Context is provided as to what was happening when the exception error occurred in operation 14210. Streaming of the exception is allowed to a common interface in operation 14212.

An error message is outputted indicating that an exception error has occurred in operation 14214.

As an option, a layer and/or domain may be added from which each exception originates to each of the names of the exception interfaces. As another option, the exceptions may be partitioned into classes based on the way exceptions are handled, exceptions associated with different layers of a system, domains, and/or the source of the exceptions. As a further option, a class may be created which represents a source of the exception and holds an original copy of the exception for avoiding creation of duplicate exceptions. Also, arbitrary exceptions may each optionally support a clone method which creates a copy of the arbitrary exception.

Developing exception handling logic without classifying and organizing exceptions makes the handling logic cumbersome and fragile to change. How should exceptions be structured?

The traditional way of conveying errors is by passing error codes from callee to caller. This approach is adequate in some cases, but in general, it is less powerful and more error prone than an exception based approach. In the traditional approach, only minimal information can be passed, such as a failure to locate a configuration file (information on which file has to be provided by some other means). It is also very easy, and common, to ignore the return code. Projects which faithfully test every return code end up mixing a high percentage of error logic with the primary logic. This increases the complexity, and the development, review, and maintenance effort.

Some computer languages (Java, C++) support an error reporting mechanism based on exceptions. In these languages an exception can be a class type and hold arbitrary information, such as the name of the configuration file that was missing. Also, exceptions cannot be as easily ignored as return codes. If the callee raises an exception and the caller doesn't handle it, the caller's caller is checked to see if it handles the exception. This continues until the exception is handled or the program terminates. Designed properly, the error handling logic will be somewhat separated from the primary logic and will be less dense than the traditional approach.

Figure 14:
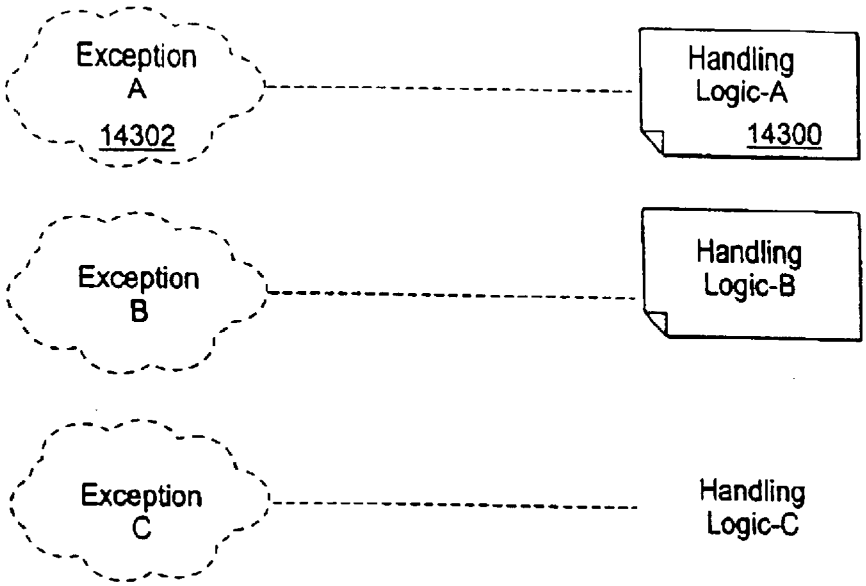
FIG. 14 illustrates how having many different exception types will cause the exception handling logic to grow.

The exception class designer is free to create any interface for the class, and each exception class can have its own unique interface. The exception handling logic 14300 will know which exception 14302 was raised (via runtime support) and can make use of the interface particular to the given exception. You can think of the exception handling logic being a set of "chunks" of logic where each chunk handles a specific type of exception. With this in mind, you can see how having many different exception types will cause the exception handling logic to grow. As a new exception type is added to the system, a new "chunk" might have to be added to the handling logic. This is not good. The code is not flexible to change and is in several places. Note FIG. 14.

Suppose you have all these chunks of handling logic and discover that the logic is pretty much the same. For example, assume your architecture is layered and you want to treat all exceptions from the persistence layer the same, such as logging the error and notifying the user. Also assume that the persistence layer can raise any one of fifty exceptions, and more are expected to be added in the future. This is fifty chunks of code that must be present in the exception handling logic, and again, this logic may be in several places. Wouldn't it be nice to write one chunk of handling logic and be done with it?

Let's take another scenario. Suppose you want to prevent any raised exception from bringing down your system, as least not without a fight. In some cases the error will be unrecoverable and there is not much you can do but release resources (locks, communication channels, . . . ) and terminate. What caused the problem is going to be on the tops of the minds of the production support people, and yours when you get their call (always in the middle of the night). You could write the exception handling logic chunks for each exception type—remembering that each exception has its own interface and will require separate logic to handle each interface—for each exception, but now you have to handle all the exceptions in the system. Wouldn't it be nice to write one chunk of handling logic and be done with it?

Therefore, to simplify the error handling logic and be able to treat groups of exceptions the same, a few techniques should be used to organize and define the exception interfaces.

The first step is to create an exception interface that all other interfaces will use or extend. It is not possible to provide one here as it greatly depends on the requirements at hand. But here are some guidelines:

- Determine the exception naming conventions. Use either a prefix or suffix to indicate that the interface is an exception. Also consider naming exceptions with the layer or domain they originate from. For example you may have an exception, CaAddressExcp, which is owned by the Customer Acquisition domain.
- Provide a means to determine where the error occurred (file, line, client or server, layer, . . . ) so that it can be investigated.
- Provide a means to determine what happened (could not open file: XYZ).
- Provide context as to what was happening (Saving account information).
- Provide a way to stream the exception or stringify it.
- Consider separate production messages versus debug messages.
- Don't try to indicate severity. This is determined by the context of the caller, not the callee.

The intent is to be able to handle any arbitrary exception the same by having a common interface. Take time and get this right, to avoid updating several other exceptions later.

Now that this base exception interface is available, any handling logic can treat all exceptions alike; only one chunk of logic needs to be written. Specific exceptions can still be handled on a case by case basis as required. You can extend this concept to further partition the exceptions by creating a tree of exception types. By handling any exceptions at particular point in the tree, you effectively handle all exception types below that point. The trick is in creating a useful tree. Here are some guidelines:

Determine where handlers will be put and how they will respond to each exception. If you find that many are handled in the same way there may be a natural grouping that can be leveraged.

Consider the stability of your grouping. Is the group cohesive or is regrouping likely?

If parts of your system are layered, consider a branch that consolidates each layer. This enables a handler to deal with all exceptions emanating from a given layer.

Consider grouping by domains (Legal, Finance).

Consider grouping by subsystem

Consider common problems such as parameter validation, pre- and post-conditions

Consider the source (client or server).

Figure 15:
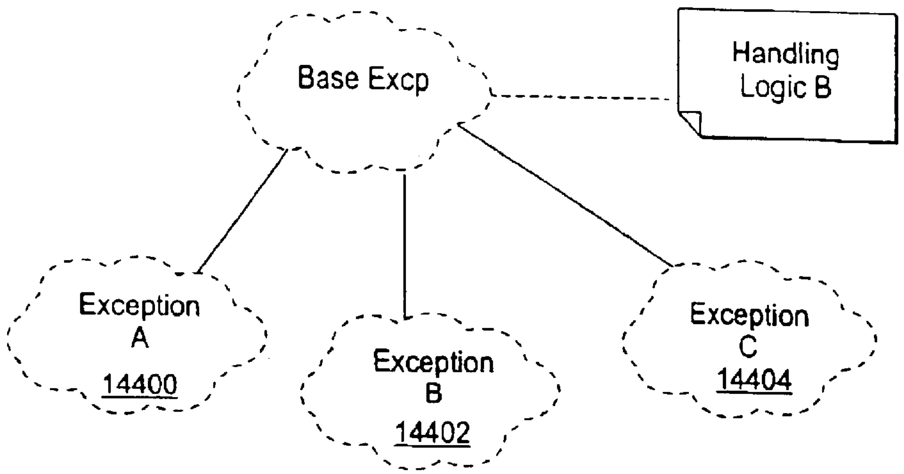
FIG. 15 illustrates that groupings are not always exclusive.

FIG. 15 illustrates that groupings are not always exclusive. It is possible to group some exceptions 14400,14402, 14404 by layer and then domains within that layer.

Benefits

- Simplicity. Simplifies handling logic by being able to write a handler that deals with the base exception type.
- Consistency. Consistent approach to error handling.
- Maintainability. Minimizes coding changes by reducing the multiple number error handling chunks.
- Manageability. Provides Conceptual Framework The solution section covered many of the considerations in creating the exception tree so this section only provides some additional details to consider.

- Wrapping and delegation can be used to simplify in certain situations. Consider a distributed application and the need or desire to handle server and client exceptions differently, or to know the source of the error. One way to avoid creating duplicate exceptions (one per source) is to create a class which represents the source and holds the original exception. For example AaServerExcp can hold a pointer to the base class AaExcp. The handling logic can catch AaServerExcp exceptions and then access the held exception. An alternative is to put a code in the base class with indicates source but then all logic needs to know to set this value and all handling logic needs to test for it.
- To hold onto an arbitrary exception you need a way of creating a copy of it, but you may not know the actual type of the exception. In C++ the exception will be destroyed when you leave the handling logic, so you need the ability to create a copy to hold onto. A common technique is it have all exceptions support a "clone" method which creates a copy of themselves.
- Consider how to stream an exception so it can be sent from server to client.

Exception Response Table

Figure 16:
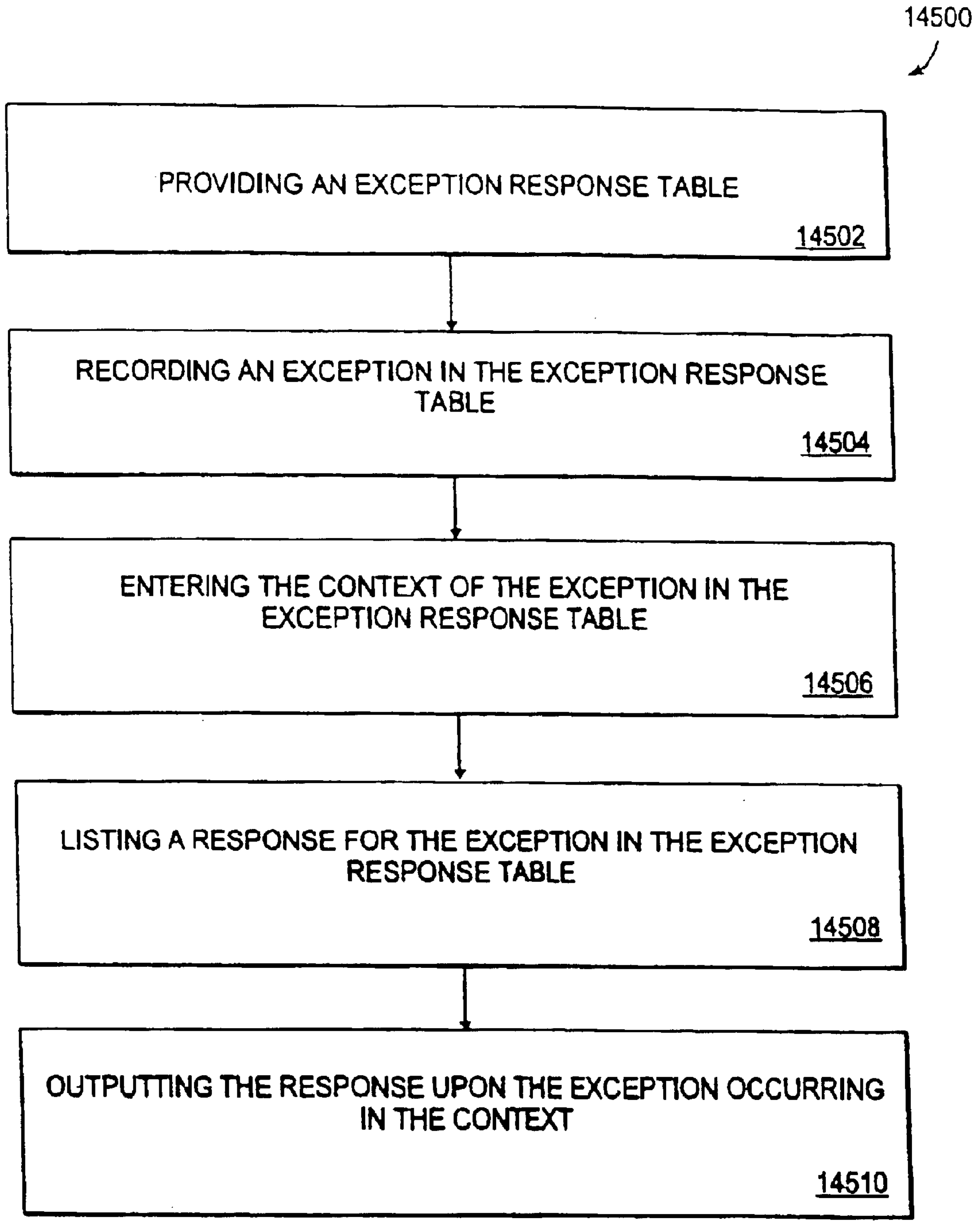
FIG. 16 illustrates a flowchart for a method for recording exception handling requirements for maintaining a consistent error handling approach in accordance with an embodiment of the present invention.

FIG. 16 illustrates a flowchart for a method 14500 for recording exception handling requirements for maintaining a consistent error handling approach. An exception response table is provided in which an exception is recorded in operations 14502 and 14504. The context of the exception is entered in the exception response table in operation 14506 and a response for the exception is listed in the exception response table in operation 14508. The response is subsequently outputted upon the exception occurring in the context in operation 14510.

A typical response and a last resort response may be listed in the exception response table. The typical response may also be outputted upon the exception occurring in the context. The last resort response may be outputted upon the exception occurring out of the context. Additionally, abbreviations may be used to reduce an output size of the exception response table. Further, the exception response table may also include an exception category field for permitting organizing multiple exceptions by source. Optionally, an optimization may be determined that can be made based on similar entries in the exception response table. Further, the optimization made may also include classifying the exceptions for organizational purposes.

The response to an exception may vary per exception type and the context in which it is thrown, such as being thrown on the client or server, and the context in which it is handled. How do you record the exception handling requirements?

During exception handling design there are several aspects to capture to achieve a consistent approach:

The set of exceptions to be handled

The set of responses to these exceptions

The context in which the exception is handled; e.g. client or server, batch or GUI The set of exceptions to handle and their organization structure varies by project. Typically exceptions are organized into hierarchies to facilitate handling. The response to an exception may vary by exception type, the context in which it was thrown, and the context in which is handled. Here are some examples of error handling decisions of a hypothetical project:

"All exceptions thrown on the server, and not handled by the server logic, will be propagated to the client."

"The current transaction is aborted if a server exception is not recoverable"

"All Server exceptions derived from Excp will be logged if not handled by the server code. The last resort handler will ensure this."

"GUI clients will display the error information in a splitter window"

"Batch clients will send error information to Operations"

These few examples demonstrate how context (Batch, GUI, Client, Server, last resort) can affect the handling of exceptions, and that even in a given context, the exception type may play a role in the handling. In a real system there may be several other context and exception-type specific requirements.

There are two common exception handling contexts that should be present in most systems. One is referred to as the Typical Response and the other is referred to as the Last Resort Response. The Typical Response is the error handling code intentionally added to handle exceptions. For example, car start( ) is likely to fail due to being out of gas. The Typical Response may be to fill the tank and retry. The Last Resort Response is what to do when an exception is not handled (the Typical Response could not handle the error, such as a hole in the gas tank). Last Resort Response is a way of capturing what should be done when application code fails to handle an error. Recovery is usually not possible at this point but the handler may be coded to log the error and notify Operations of the problem. Without this response, systems may crash unnecessarily, or without indicating what happened.

All these permutations of exception types, contexts, and responses need to be managed in order to maintain a consistent error handling approach.

Therefore, use an Exception Response Table to capture the exceptions in the system, and the appropriate responses by context. What is important to capture is the exception, context, response, information; documenting the error handling requirements.

The following table lists exceptions by category and type, with the typical and last resort response. Other contexts and responses are listed within these columns. The exception category field is optional but can help to organize exceptions by their source (application, architecture, . . . ) or hierarchy. This table can become quite packed with response information so a nomenclature may need to be developed to condense the information. The implementation section provides an example of this; Other ways of formatting this information are possible.

| Exception | Typical Response | Last Resort Response |
|---|---|---|
| Exception Category<br>Exception-Name<br>Description<br>. . .<br>Exception Category<br>Exception-Name<br>Description | | |

Benefits

Requirements Traceability. Exceptions requirements are captured and managed through implementation.

Hierarchy Design. Analysis may show optimizations that can be made such as handling a subtree of exceptions with the same code, as the response is the same to any exception in the subtree.

Interface Design. Discovery of interface requirements on the exception classes to support a particular response is another benefit.

Handier design. Assists in exception handling design by identifying common responses that can be leveraged by the handlers.

The table below shows an example of an Exception Response Table for a fictitious client/server system. This is followed by the nomenclature section which is customized per project.

| Name | Typical Response | Last Resort Response |
|---|---|---|
| Architecture Framework Exceptions | | |
| AaAssertionExcp | C: N/A | C: L, Popup (severe), Shutdown |
| Assertion failure | S: N/A | S: L, N, P (AaServerAaExcp), Shutdown |
| AaExcp | C: N/A | C: N/A |
| Base class for exceptions | S: N/A | S: N/A |
| Application Exceptions | | |
| CaBalanceExcp | C: Popup (warn) | C: L, Popup (warn) |
| Account out of balance | S: P (AaServerAaExcp) | S: L, N, P (AaServerAaExcp) |

Nomenclature:

Note: Abbreviations were used so that the table could be printed. The nomenclature section is only meant to serve as an example.

Context:

C=Client

S=Server

Response:

N/A=not applicable; don't handle

L=log error

L(diagnostic)=log errors for diagnostic purposes only

N=notify operations

Optional=application, context dependent. Not required to be caught P=pass exception to client P(<exception>)=pass given exception type to client, will be different from type caught Popup(wam)=display warning message Popup(severe)=display severe warning message Popup(retry)=display retry message Shutdown=release resources and shutdown gracefully.

Exception Hierarchy discusses how to organize exceptions.

Last Resort Exception Handling describes where handlers should be placed to prevent a program from terminating without warning.

Polymorphic Exception Handler describes how to design and code exception handlers that reduce the impact of changes and the overall size of the error handling logic.

Polymorphic Exception Handler

Figure 17:
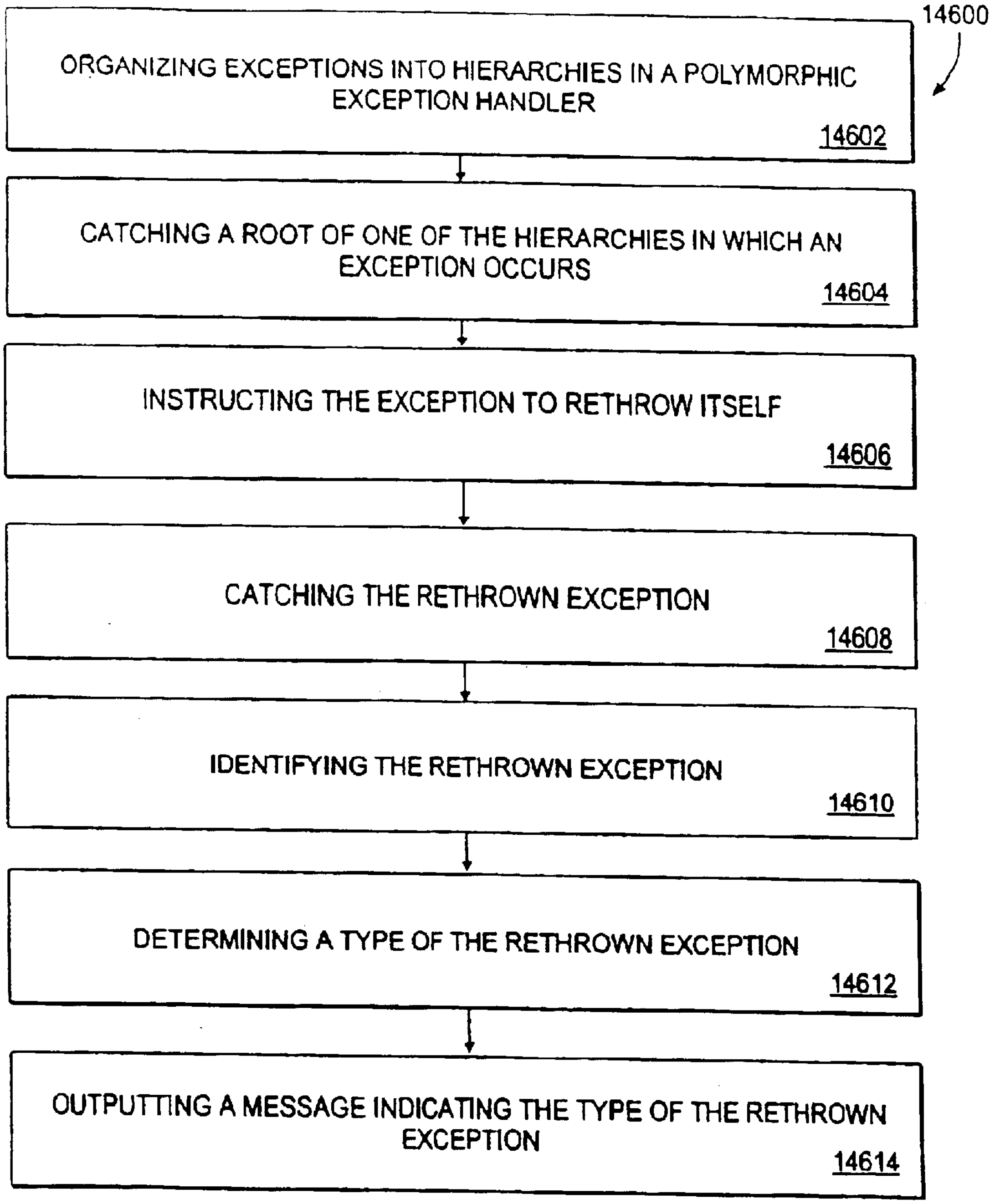
FIG. 17 illustrates a flowchart for a method for minimizing the amount of changes that need to be made to exception handling logic when new exceptions are added in accordance with an embodiment of the present invention.

FIG. 17 illustrates a flowchart for a method 14600 for minimizing the amount of changes that need to be made to exception handling logic when new exceptions are added. Exceptions are organized into hierarchies in a polymorphic exception handler in operation 14602. A root of one of the hierarchies in which an exception occurs is caught in operation 14604. The exception is instructed to rethrow itself in operation 14606. The rethrown exception is caught and identified in operations 14608 and 14610. A type of the rethrown exception is determined in operation 14612 and a message is outputted indicating the type of the rethrown exception in operation 14614.

Single exception interfaces may be used as the roots of the hierarchies. Also, the polymorphic exception handler may handle each unique root. Further, an added exception may be organized into a hierarchy and handled by the polymorphic exception handler. As an option, handling behavior may be encapsulated in the polymorphic exception handler. As additional option, catch blocks may also be created to catch the rethrown exception.

Large systems can be quite complex and require error management integrating disparate components and/or libraries (i.e. DBMS APTs, data structures library, middleware, etc) How can exception handling logic be written so that little or no changes are required when new exceptions are added to the system?

A software system using exceptions as the error handling approach may have to respond to a variety of exceptions. Handling each exception type on a case by case basis is cumbersome and expensive, both in terms of initial development and subsequent maintenance. In languages such as Java and C++, the mechanism to handle exceptions is to use try-catch blocks which look like this:

```
try
{
    // perform some work here
}
catch (ExceptionTypeA& excp)
{
    // Exception A thrown. Handling logic here
}
catch (ExceptionTypeB& excp)
{
    // Exception B thrown. Handling logic here
}
catch (. . .)
{
    // Don't know what was thrown, but still need to handle it.
}
```

Figure 18:
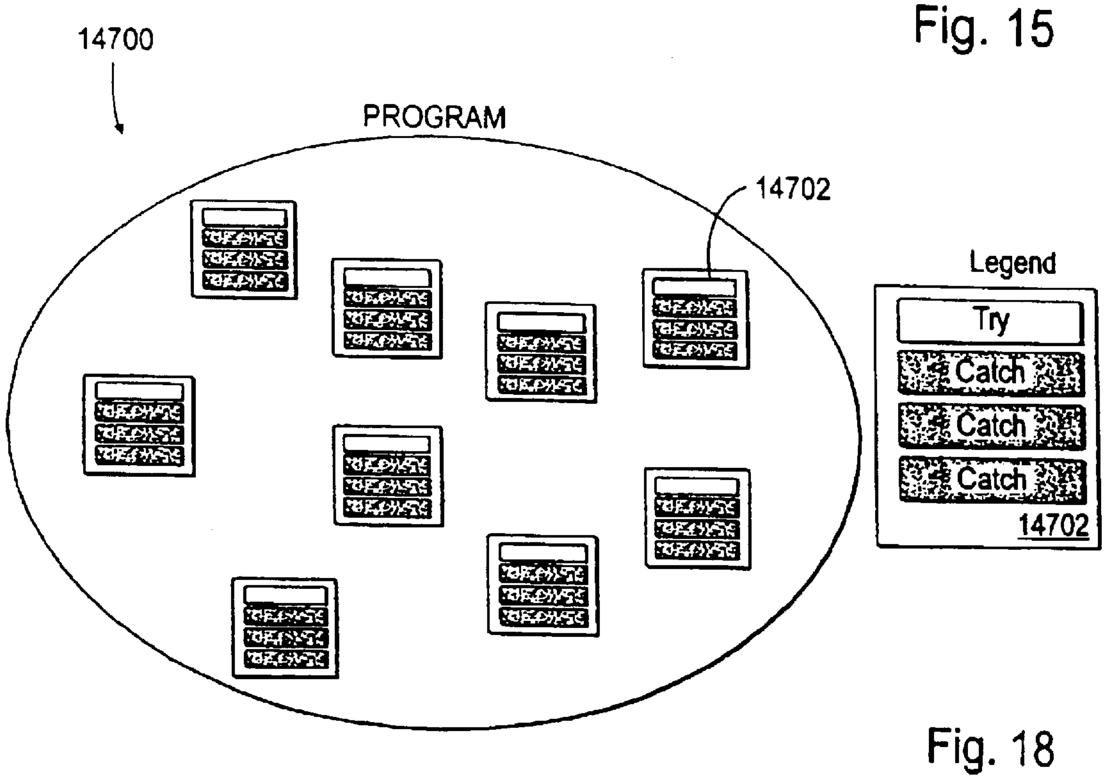
FIG. 18 depicts a program (i.e., the exception handler of the present invention) with a few try-catch blocks.

This example shows only two explicit exception types being handled but a system typically has several potential exceptions. If the development of the exception types is poorly designed the try-catch blocks can become quite large as they attempt to handle each exception. Imagine trying to handle, say, fifty more exception types, in several places, in the code. The error handling code expansion is exponential! FIG. 18 depicts a program 14700 (i.e., the exception handler of the present invention) with a few try-catch blocks 14702. As more exceptions are added these blocks expand to handle each new exception.

Another problem with exception handling logic is that it can be quite involved, such as logging the information to a persistent store, notifying Operations support, rolling back a transaction, etc. the example only showed one commented line to represent the code. Again, imagine each catch block requiring several lines of code. This logic may be repeated in each catch block.

Taken together, varying exception types and potentially repeating and complex logic in the catch blocks, the development and maintenance efforts regarding error handling are going to be much more expensive than they need to be.

Therefore, structure the exceptions into hierarchies, create an exception handler object that performs the catch block logic, and minimize the number of catch blocks required to support a given try-block.

Exception Hierarchies organizes exceptions into hierarchies and facilitates the design of exception handlers. Handlers can then be designed to handle the roots of hierarchies. This is much simpler than handling each exception type on a case by case basis. In custom development where the project has control of all code, a single exception interface can be used as the root. The more likely situation is some custom development and using third party libraries which may also use exceptions. In these cases, the exception handler will handle each unique root.

Using an exception handler, versus custom logic per catch block, reduces the maintenance and development effort as the code is easier to read, there is less of it, and any changes that need to be made can be made in one place.

The following code snippet shows the form of the try-catch blocks using the polymorphic exception handler. It may seem equivalent to the prior catch-block example but it is not. The first distinction is the type of exceptions handled. In this case, the roots of the exception hierarchies are caught, not the individual exception types. For this example there are only two exception hierarchies in the system, so only these roots are handled. What this means is that as new exceptions are added to the hierarchies, this code does not change, and remember, this code is in several places in the system.

The second difference with this code is the encapsulation of the handling behavior in the exception handler. The handle method can perform arbitrarily complex logic behind the scenes, and if this needs to change, is changed in one place. For example, if the current handling logic logs a message to disk and now needs to be extended to notify Operations personnel, this can be centralized in on place. The code as written does not need to change.

```
try
{
    // perform some work here
}
catch (ExceptionRoot& excp)
{
    ExcpHdlr hdlr;
        hdlr.handle(excp);
}
catch (ThirdPartyRoot& excp)
{
    ExcpHdlr hdlr;
        hdlr.handle(excp);
}
catch (. . .)
{
    ExcpHdlr hdlr;
        hdlr.handle( );
}
```

Figure 19:
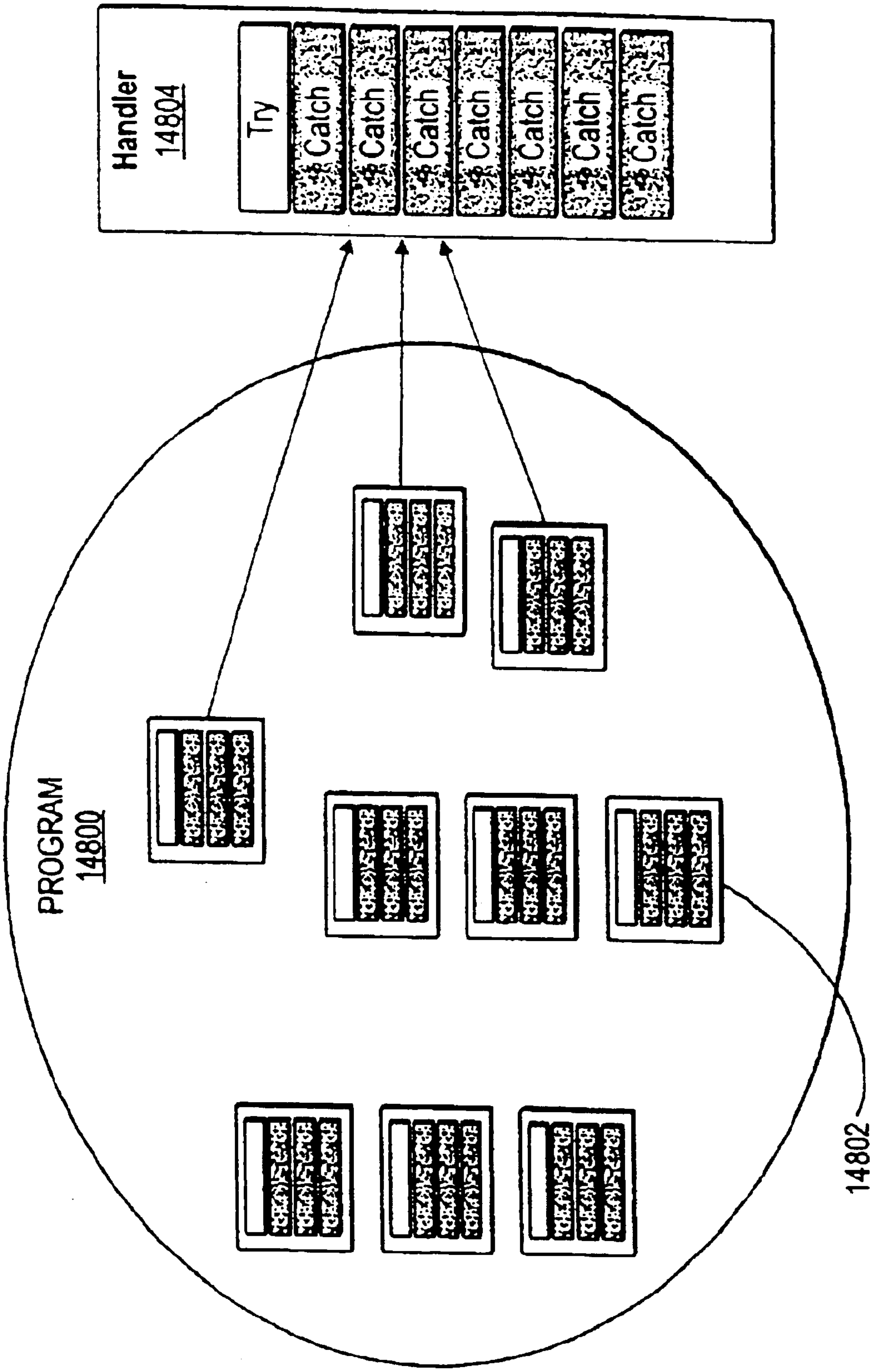
FIG. 19 depicts a program (the polymorphic exception handler) with smaller catch blocks.

FIG. 19 depicts the same program 14800 (the polymorphic exception handler) with smaller catch blocks 14802. A handler 14802 has been added which consolidates the common code and the number of catch blocks has been reduced overall by making the handler responsible for handling each exception. The downside is that now the handler is subject to frequent change as exceptions are added to the system. The maintenance effort outweighs this disadvantage.

The examples have shown a single exception handler being used. In practice it is more likely that multiple will be used. For example, the exception handler on a server may have different requirements or constraints than a client, or one client may be GUI based and display pop-up error messages, where another client is a batch program that needs to send notification messages to Operations. This can be handled by creating multiple handlers or using the Strategy pattern to customize the behavior.

Benefits

Simplicity. Reduces development and maintenance effort required for exception handling Maintainability. Reduces impact of changes Robustness. Centralizes/Encapsulates handling logic Flexibility. Multiple handlers can be used The exception base class declares a method, rethrow, which is used by the handler to determine the real type of the exception. Another approach is to use double dispatch which may be show in a future version. Below is an example of this interface only showing the essential detail.

```
//----------------------------------------
//- Base Class of Exceptions
//----------------------------------------
class Excp
{
public:
```

-continued

```
  //- Rethrow the exception. Throw *this;
  virtual void rethrow( ) const = 0;
};
//----------------------------------------
//-Example Derived Class of Exceptions
//----------------------------------------
class Derived : public Excp
{
public:
  virtual void rethrow( ) const {throw *this;}
};
//----------------------------------------
//-Example Derived Class of Exceptions
//----------------------------------------
class SubDerived : public Derived
{
public:
  virtual void rethrow( ) const {throw *this;}
};
```

When the exception handler is passed the exception from the catch-block all it knows it that it has a root exception type. For some projects this may be sufficient if the exception interface is rich enough and all exceptions are treated the same. In other cases, exceptions may require specialized treatment. With the rethrow mechanism in place, the handler can create a try-catch block and have the exception rethrow itself. The catch blocks are then used to catch the specific exception type.

```
//----------------------------------------
//- Exception Handler
//----------------------------------------
class ExceptionHandler
{
public:
 ExceptionHandler( );
 //- Handle the root exception
 void handle (const Excp&);
 //- Handle a third party root
 void handle(const ThirdPartyExcp&);
};
//----------------------------------------
//- Handle the exception
//----------------------------------------
void ExceptionHandler::handle(const Excp& e)
{
 //- Rethrow the exception to get the specific type
 //- Note that catches are in the order of most specific to
 //- most general.
try
{
 e.rethrow( );
}
catch(SubDerived& excp)
{
 // Handle SubDerived
}
catch(Derived& excp)
{
 // Handle Derived
}
catch(. . .)
{
 // Handle e parameter here since nothing matched it.
 }
}
```

-continued

```
ExceptionHandler::handle(const ThirdPartyExcp& e)
{
  // Handle based on ThirdPartyExcp interface
  // Can't rethrow because ThirdPartyExcp doesn't support this.
  // Could use RTTI if needed.
}
```

Load Balancer

Figure 20:
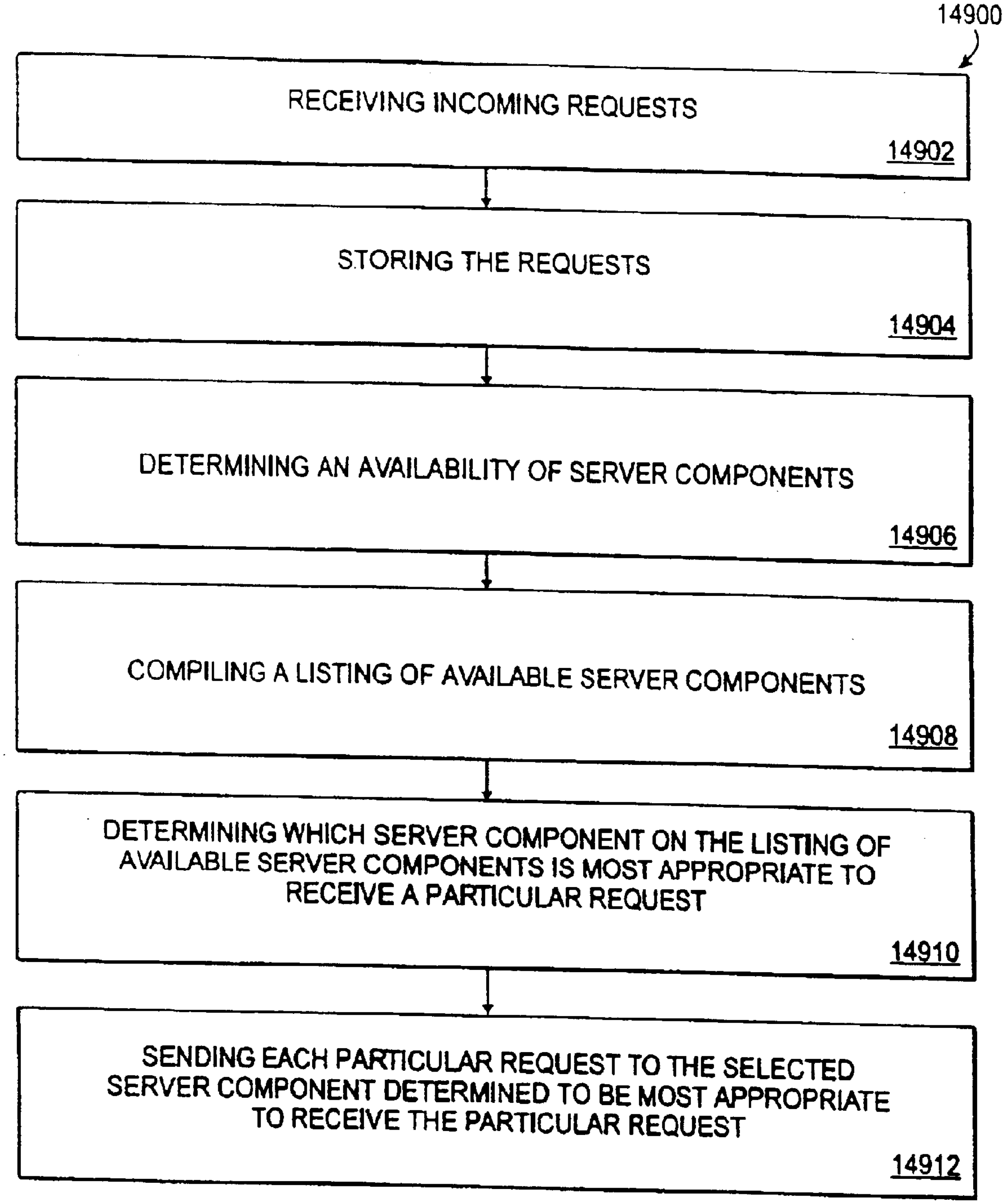
FIG. 20 illustrates a flowchart for a method for distributing incoming requests amongst server components for optimizing usage of resources in accordance with an embodiment of the present invention.

FIG. 20 illustrates a flowchart for a method 14900 for distributing incoming requests amongst server components for optimizing usage of resources. Incoming requests are received and stored in operations 14902 and 14904. An availability of server components is determined and a listing of available server components is compiled in operations 14906 and 14908. A determination is made as to which server component on the listing of available server components is most appropriate to receive a particular request in operation 14910. Each particular request is sent to the selected server component determined to be most appropriate to receive the particular request in operation 14912.

Optionally, the determination of which server component is the most appropriate may be performed by allocating the requests on a round-robin basis whereby requests are assigned to consecutive server components by traversing along the listing of available server components. As another option, the determination of which server component is the most appropriate may also include calculating an amount of utilization that each available server component is currently experiencing.

The amount of utilization of each available server components may be calculated based on current CPU utilization, kernel scheduling run-queue length, current network traffic at a node to the server component, and/or a number of requests currently being serviced. Also, a request may be rerouted to a different available server component upon a crash of the selected server component. Additionally, the server components may be saved in a persistent store, wherein a check is made to determine whether a connection to a server component needs to be reestablished.

In order to support scalability in a high volume distributed component environment, resources tend to be replicated. How can incoming requests be distributed amongst the available server components in order to optimize the usage of system resources?

In a distributed system, server components provide functions and data that can be accessed by client components. Many identical copies of a server component can be running on different platforms in the system in order to support large volumes of client requests.

In order to make use of the system's scarce resources, some way of routing an incoming request to the best server component available is required. In general, all requests take a similar length of time to service.

Figure 21:
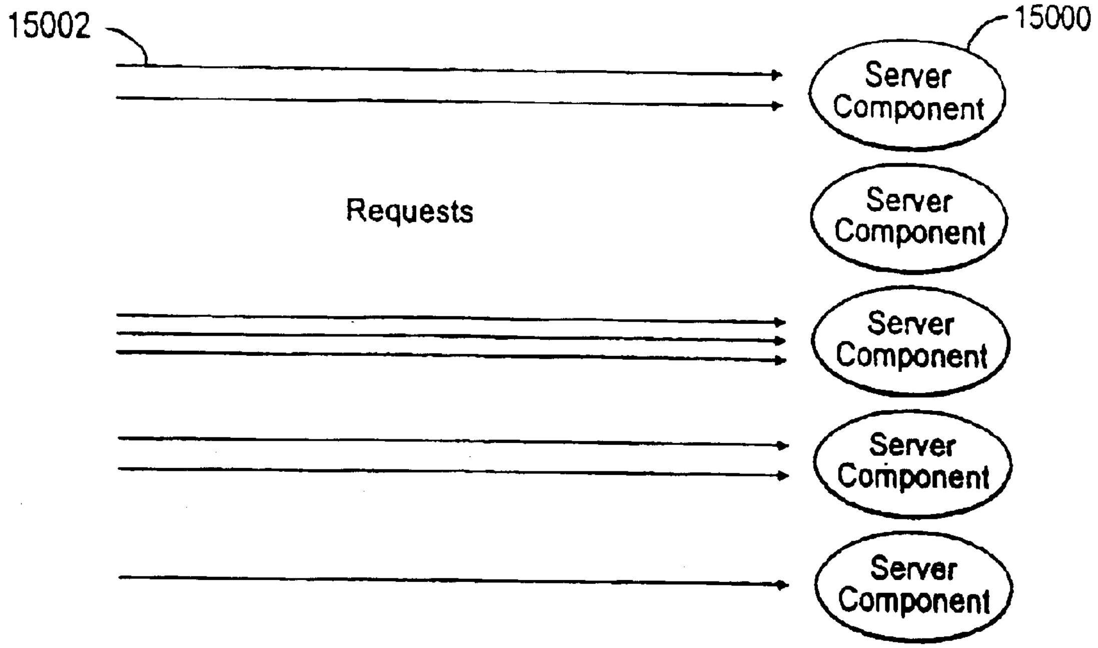
FIG. 21 illustrates server components receiving service requests.

FIG. 21 illustrates server components 15000 receiving service requests 15002.

Therefore, use Load Balancer to select the best server component out of an available pool for the client to use.

Figure 22:
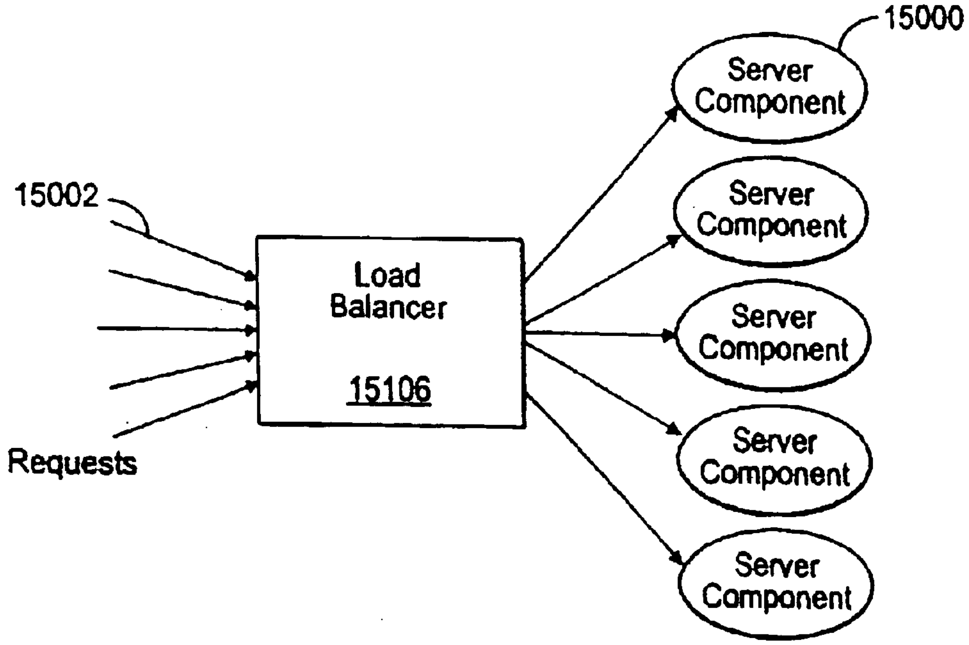
FIG. 22 illustrates a load balancer mediating the requests of FIG. 21.

FIG. 22 illustrates a load balancer 15100 mediating the requests of FIG. 21.

Incoming client requests are routed by the Load Balancer to the best available server component.

A number of possible strategies exist for deciding which server component is the most appropriate at a given point in time.

Round Robin—Allocate the received requests on a round-robin basis, whereby a list of the available server components is created and, as requests are received, they are allocated by traversing down the list. When the end of the list is reached, the next request is allocated to the server component at the beginning of the list.

Utilization Based—Allocate the received requests based on the utilization that each server component is currently experiencing. The definition of utilization can be tailored to meet specific requirements or deployment strategies. It may be based on a combination of current CPU utilization, kernel scheduling run-queue length, current network traffic at that node, number of requests currently being serviced, or any other factors particular to the environment.

Benefits

Performance. Based on the selection strategy employed, the client is connected to the server component that is best able to serve it.

Scalability. As the number of users and requests increase, processing can be distributed across the available resources.

Robustness. In the event of the server crashing, the client can then ask the Load Balancer to provide another server component for it to use. This can be extended still further by federating Load Balancers and their associated server component pools.

The following is the IDL that was used to define the Load Balancer:

```
interface LoadBalancer
{
    Object getService ( )
        raises (ArchitectureException);
    void register (in Object aServerComponent)
        raises (ArchitectureException);
};
```

Collaborations

Round Robin Load Balancing

Utilization Based Load Balancing

User Context

Figure 23:
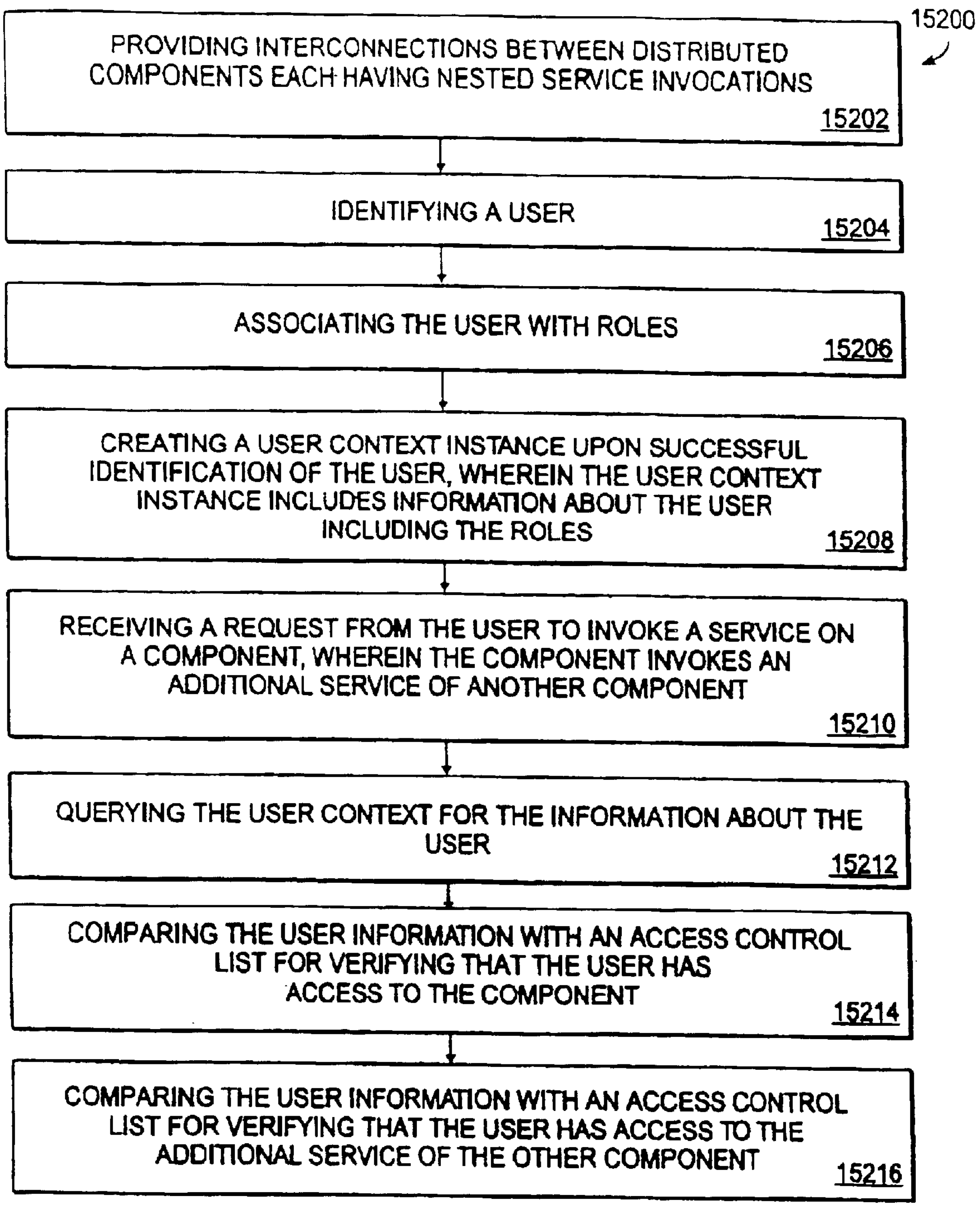
FIG. 23 illustrates a flowchart for a method for maintaining a security profile throughout nested service invocations on distributed components in accordance with an embodiment of the present invention.

FIG. 23 illustrates a flowchart for a method 15200 for maintaining a security profile throughout nested service invocations on distributed components. In operation 15202, interconnections are provided between distributed components each having nested service invocations. A user is identified in operation 15204. The user is associated with roles in operation 15206. In operation 15208, a user context instance is created upon successful identification of the user. The user context instance also includes information about the user including the roles. A request is received from the user to invoke a service on a component in operation 15210. The component invokes an additional service of another component. The user context is queried for the information about the user in operation 15212. The user information is compared with an access control list for verifying that the user has access to the component in operation 15214. The user information is also compared with an access control list for verifying that the user has access to the additional service of the other component in operation 15216.

Optionally, all user interactions may be logged as well. As another option, a user interface may be modified to provide access to actions that can be performed by the user based on an identity of the user and the roles associated with the user. The user context instance may also be passed along as a parameter of service invocations. Additionally, the service invoked may associate any objects created, updated, or deleted with the user context instance. As a further option, the user context instance may also encapsulate security certificates of the user.

For security and auditing purposes, user information must be maintained throughout a service's implementation across multiple, distributed platforms. How can this original security profile be maintained throughout nested service invocations on distributed components?

All mission-critical systems require some form of security and auditing capabilities. These capabilities restrict who can use the system and what they can and cannot do and, in the case of a security breach or dispute, resolve who did what and when.

To meet these capabilities, users must be identified, associated with roles and granted authorization before any operation proceeds. In addition, all user interactions and results of those interactions may be logged. On a user interface, access to certain panels and controls are granted according to a user's role.

In a distributed, component-based system, these complex requirements become even more difficult to implement. Typically, a client (or user) invokes some service on a component. That component may invoke any number of additional services on any number of additional components to complete its designated task. These successive service invocations are a result of the initial client request so the security profile that allowed the initial request must also allow all successive requests.

Figure 24:
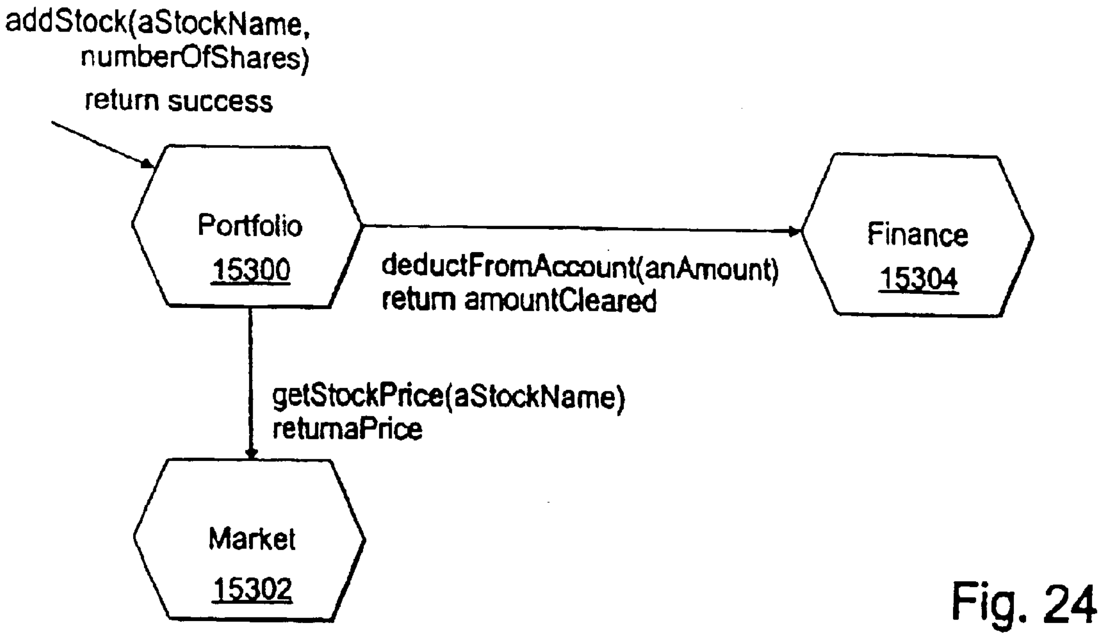
FIG. 24 illustrates a component interaction diagram showing an interaction between a number of components in a financial system.

FIG. 24 illustrates a component interaction diagram showing an interaction between a number of components in a financial system. A user initiates an addStock( ) service on the Portfolio component 15300. To perform the addStock( ) service, the Portfolio must use the getStockPrice( ) and the deductFromAccount( ) services on the Market and Finance components 15302,15304, respectively. This implies that a user who can access the addStock( ) service must also have permissions to access the getStockPrice( ) and the deductFromAccount( ) services. This may need to be checked by each of the distributed components within the context of one logical service. In addition, auditing what has been done, or perhaps requested to be done, adds another common requirement that must be accounted for. A component servicing multiple clients must associate client requests with corresponding services invoked on business objects. This information must be persisted as each change is committed.

Therefore, represent information about a user in a shared User Context object. This object maintains a user's unique identification that can be subsequently checked against a resource's access control list (ACL). A User Context instance is created upon a user's successful, validated identification to the system (usually through some "login" mechanism). After that, the system user interface can modify itself to provide only the actions that can be performed by that particular user acting in a particular role. Controls may query the User Context and modify their own visual state as needed (enable/disable, hide/show).

The User Context can also be passed along as a parameter of service invocations. All public, stateless services on a component should provide for a User Context to be passed along as a parameter. The service being invoked can then associate any Business Objects created, updated, or deleted as a result of the service invocation with the User Context.

Figure 25:
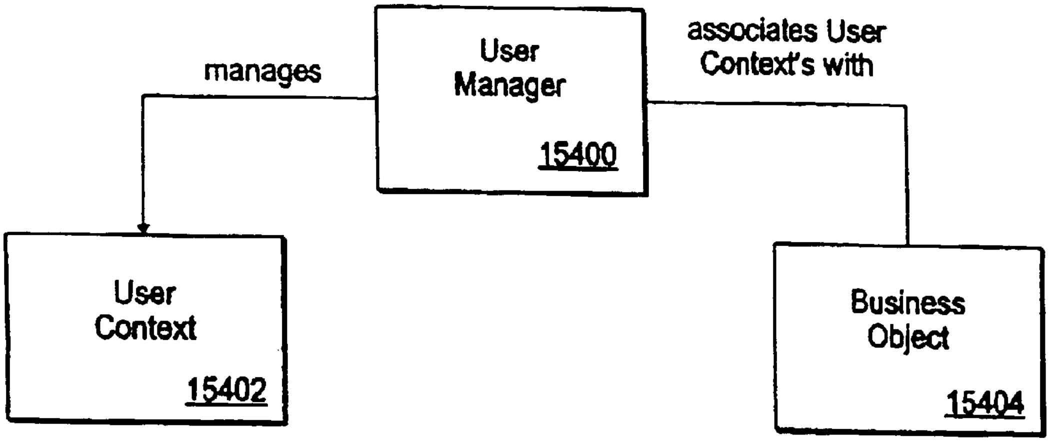
FIG. 25 illustrates a user manger/user context relationship diagram.

One example of this would be a User Manager 15400 associating a User Context instance 15402 with the Business Objects 15404 they are affecting. FIG. 25 illustrates a user manger/user context relationship diagram.

These associations can be used for auditing purposes. When a change to a Business Object is committed, a log entry can be created tying the change with the user that triggered it.

Benefits

Common User Representation. One single representation of a user and their access rights can be shared across all areas of the system.

Extensible Security. Because there is one source for the User Context various policies or strategies could be used to identity and authenticate the User within a context. For example, it could encapsulate the User's certificates that allow more advanced security strategies to determine authorization.

Class UserContext

UserContext(Identifier identifier)

Identifier getIdentifier( )

String getName( )

void setName(String newName)

void addRight(String accessArea, AccessLevel level)

void removeRight(String accessArea, AccessLevel level)

Vector getRights(String accessArea)

boolean canCreateIn(String accessArea)

boolean canReadIn(String accessArea)

boolean canUpdateIn(String accessArea)

boolean canDeleteIn(String accessArea)

Class AccessLevel static AccessLevel create( )

static AccessLevel read( )

static AccessLevel update( )

static AccessLevel delete( )

boolean (AccessLevel anAccessLevel)

It is expected that the User Context will be passed from component to component. In this case the User Context will have to be defined using some sort of interface language definition (IDL).

Collaborations

Permission

Policy

SecurityManager

Logging

Alternatives

MTS & EJB offer an environment that does not require the passing of the context with every operation. A container as a set<context type> that provides a handle within the component for the methods to access the cached context.

What is claimed is:

1. A method for maintaining a security profile throughout nested service invocations on a distributed, component-based system, comprising the steps of:

(a) providing interconnections between distributed components each having nested service invocations;

(b) identifying a user;

(c) associating the user with roles;

(d) creating a user context instance upon successful identification of the user, wherein the user context instance includes information about the user including the roles and a unique user identifier;

(e) receiving a request from the user to invoke a first service on a first component, wherein the first component invokes a second service of a second component such that the user context instance is passed as a parameter from the first component to the second component, and wherein completion of the second service is necessary to complete the first service;

(f) querying the user context instance for the unique user identifier;

(g) comparing the unique user identifier in the user context instance with an access control list for verifying that the user has access to the first component; and (h) comparing the unique user identifier in the user context instance with an access control list for verifying that the user has access to the second service of the second component.

2. A method as recited in claim 1, further comprising the step of logging all user interactions.

3. A method as recited in claim 1, further comprising the step of modifying a user interface to provide access to actions that can be performed by the user based on the unique user identifier and the roles associated with the user.

4. A method as recited in claim 1, wherein the first service invoked associates any objects created, updated, or deleted as a result of the invocation of the first service with the user context instance.

5. A method as recited in claim 1, wherein the user context instance encapsulates security certificates of the user.

6. A computer program embodied on a computer readable medium for maintaining a security profile throughout nested service invocations on a distributed, component-based system, comprising:

(a) a code segment that provides interconnections between distributed components each having nested service invocations;

(b) a code segment that identifies a user;

(c) a code segment that associates the user with roles;

(d) a code segment that creates a user context instance upon successful identification of the user, wherein the user context instance includes information about the user including the roles and a unique user identifier;

(e) a codc segment that receives a request from the user to invoke a first service on a first component, wherein the first component invokes a second service of a second component such that the user context instance is passed as a parameter from the first component to the second component, and wherein completion of the second service is necessary to complete the first service;

(f) a code segment that queries the user context instance for the unique user identifier;

(g) a code segment that compares the unique user identifier in the user context instance with an access control list for verifying that the user has access to the first component; and (h) a code segment that compares the unique user identifier in the user context instance with an access control list for verifying that the user has access to the second service of the second component.

7. A computer program as recited in claim 6, further comprising a code segment that logs all user interactions.

8. A computer program as recited in claim 6, further comprising a code segment that modifies a user interface to provide access to actions that can be performed by the user based on the unique user identifier and the roles associated with the user.

9. A computer program as recited in claim 6, wherein the first service invoked associates any objects created, updated, or deleted as a result of the invocation of the first service with the user context instance.

10. A computer program as recited in claim 6, wherein the user context instance encapsulates security certificates of the user.

11. A system for maintaining a security profile throughout nested service invocations on a distributed, component-based system, comprising:

(a) logic that provides interconnections between distributed components each having nested service invocations;

(b) logic that identifies a user;

(c) logic that associates the user with roles;

(d) logic that creates a user context instance upon successful identification of the user, wherein the user context instance includes information about the user including the roles and a unique user identifier;

(e) logic that receives a request from the user to invoke a first service on a first component, wherein the first component invokes a second service of a second component such that the user context instance is passed as a parameter from the first component to the second component, and wherein completion of the second service is necessary to complete the first service;

(f) logic that queries the user context instance for the unique user identifier;

(g) logic that compares the unique user identifier in the user context instance with an access control list for verifying that the user has access to the first component; and (h) logic that compares the unique user identifier in the user context instance with an access control list for verifying that the user has access to the second service of the second component.

12. A system as recited in claim 11, further comprising logic that logs all user interactions.

13. A system as recited in claim 11, further comprising logic that modifies a user interface to provide access to actions that can be performed by the user based on the unique user identifier and the roles associated with the user.

14. A system as recited in claim 11, wherein the first service invoked associates any objects created, updated, or deleted as a result of the invocation of the first service with the user context instance.

15. A system as recited in claim 11, wherein the user context instance encapsulates security certificates of the user.

* * * * *